(12) United States Patent
Danilak et al.

(10) Patent No.: US 8,386,648 B1
(45) Date of Patent: *Feb. 26, 2013

(54) HARDWARE SUPPORT SYSTEM FOR ACCELERATED DISK I/O

(75) Inventors: Radoslav Danilak, Santa Clara, CA (US); Krishnaraj S. Rao, Sunnyvale, CA (US)

(73) Assignee: Nvidia Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/725,663

(22) Filed: Dec. 1, 2003

Related U.S. Application Data

(60) Provisional application No. 60/483,401, filed on Jun. 26, 2003.

(51) Int. Cl.
*G06F 3/00* (2006.01)
(52) U.S. Cl. .................................. 710/5; 710/7; 710/10
(58) Field of Classification Search .............. 710/22–24, 710/26, 33, 306, 308, 5–8, 10, 52
See application file for complete search history.

(56) References Cited

U.S. PATENT DOCUMENTS

| | | | |
|---|---|---|---|
| 5,455,913 A | 10/1995 | Shrock et al. | |
| 5,546,548 A | 8/1996 | Chen et al. | |
| 5,649,230 A | 7/1997 | Lentz | |
| 5,717,954 A | 2/1998 | Grieff et al. | |
| 5,761,468 A | 6/1998 | Emberson | |
| 5,768,548 A | 6/1998 | Young et al. | |
| 5,790,817 A | 8/1998 | Asghar et al. | |
| 5,822,568 A | 10/1998 | Swanstrom | |
| 5,864,876 A | 1/1999 | Rossum et al. | |
| 5,881,248 A | 3/1999 | Mergard | |
| 5,923,859 A | 7/1999 | Melo et al. | |
| 5,940,866 A | 8/1999 | Chisholm et al. | |
| 5,968,143 A * | 10/1999 | Chisholm et al. | 710/23 |
| 6,016,528 A | 1/2000 | Jaramillo et al. | |
| 6,018,803 A | 1/2000 | Kardach | |
| 6,029,223 A | 2/2000 | Klein | |
| 6,029,228 A | 2/2000 | Cai et al. | |
| 6,085,276 A | 7/2000 | VanDoren et al. | |
| 6,085,278 A | 7/2000 | Gates et al. | |
| 6,098,114 A | 8/2000 | McDonald et al. | |
| 6,101,568 A | 8/2000 | Richardson | |
| 6,157,980 A | 12/2000 | Arimilli et al. | |
| 6,175,634 B1 | 1/2001 | Graumann | |
| 6,182,112 B1 | 1/2001 | Malek et al. | |
| 6,185,634 B1 * | 2/2001 | Wilcox | 710/26 |
| 6,205,524 B1 | 3/2001 | Ng | |
| 6,226,695 B1 | 5/2001 | Kaiser et al. | |
| 6,233,656 B1 | 5/2001 | Jones et al. | |
| 6,266,742 B1 | 7/2001 | Challenger et al. | |
| 6,298,407 B1 * | 10/2001 | Davis et al. | 710/314 |

(Continued)

OTHER PUBLICATIONS

Brandt, Scott, "Module 2: Computer-System Structure" Spring 2001, http://www/spe/icsc/edi/-sbrandt/courses/Spring01/111/slides/mod2.1.pdf.

(Continued)

*Primary Examiner* — Chun-Kuan Lee

(57) ABSTRACT

A hardware support system for implementing accelerated disk I/O for a computer system. The system includes a bus interface for interfacing with a processor and a system memory of the computer system, a disk I/O engine coupled to the bus interface, and a device interface coupled to the disk I/O engine for interfacing the disk I/O engine with a disk drive. The disk I/O engine is configured to cause a start up of the disk drive upon receiving a disk start up command from the processor. The disk I/O engine is further configured to execute a disk transaction by processing the disk transaction information from a bypass register coupled to the disk I/O engine.

5 Claims, 22 Drawing Sheets

U.S. PATENT DOCUMENTS

| | | |
|---|---|---|
| 6,314,472 B1 | 11/2001 | Trieu et al. |
| 6,345,341 B1 | 2/2002 | Arimilli et al. |
| 6,397,296 B1 | 5/2002 | Werner |
| 6,418,496 B2 | 7/2002 | Pawlowski et al. |
| 6,442,634 B2 | 8/2002 | Bronson et al. |
| 6,480,939 B2 | 11/2002 | Anderson et al. |
| 6,526,518 B1 | 2/2003 | Catlin et al. |
| 6,560,657 B1 | 5/2003 | Gandhi et al. |
| 6,571,318 B1 | 5/2003 | Sander et al. |
| 6,574,712 B1 | 6/2003 | Kahle et al. |
| 6,578,102 B1 | 6/2003 | Batchelor et al. |
| 6,631,434 B1 | 10/2003 | Johnson et al. |
| 6,681,281 B1 | 1/2004 | Maleck |
| 6,681,285 B1 | 1/2004 | Ng |
| 6,696,854 B2 * | 2/2004 | Momtaz et al. ............... 326/37 |
| 6,696,954 B2 | 2/2004 | Chung |
| 6,745,258 B1 | 6/2004 | Pellegrino et al. |
| 6,751,038 B1 | 6/2004 | Wada |
| 6,754,755 B1 | 6/2004 | Johnson et al. |
| 6,782,457 B2 | 8/2004 | Hill et al. |
| 6,801,963 B2 | 10/2004 | Bissessur et al. |
| 6,842,803 B2 | 1/2005 | Schmidt et al. |
| 6,877,048 B2 | 4/2005 | Bilak et al. |
| 6,898,649 B2 | 5/2005 | Goudie |
| 6,901,467 B2 | 5/2005 | Shah et al. |
| 6,904,473 B1 | 6/2005 | Bloxham et al. |
| 6,907,480 B2 | 6/2005 | Takei et al. |
| 6,910,106 B2 | 6/2005 | Sechrest et al. |
| 6,915,363 B2 * | 7/2005 | Wood et al. ............... 710/74 |
| 6,950,892 B2 | 9/2005 | Bell, Jr. et al. |
| 6,957,290 B1 | 10/2005 | Rowlands et al. |
| 6,996,684 B2 | 2/2006 | Tseng et al. |
| 6,999,426 B2 | 2/2006 | Miyoshi |
| 7,032,046 B2 | 4/2006 | Horii et al. |
| 7,096,291 B2 | 8/2006 | Lin |
| 7,124,232 B2 | 10/2006 | Takeda et al. |
| 7,139,878 B2 | 11/2006 | Malik et al. |
| 7,143,219 B1 | 11/2006 | Chaudhari et al. |
| 7,177,985 B1 | 2/2007 | Diefendorff |
| 7,263,566 B2 | 8/2007 | Ganasan et al. |
| 7,376,846 B2 | 5/2008 | Hawkins et al. |
| 7,389,466 B1 | 6/2008 | Harmer et al. |
| 7,505,461 B2 | 3/2009 | Matsuda et al. |
| 7,525,986 B2 | 4/2009 | Lee et al. |
| 7,600,058 B1 | 10/2009 | Danilak |
| 7,706,756 B2 | 4/2010 | Sato et al. |
| 7,895,385 B2 | 2/2011 | Raju |
| 2001/0001873 A1 | 5/2001 | Wickeraad et al. |
| 2001/0014928 A1 | 8/2001 | Chrysos et al. |
| 2002/0023204 A1 | 2/2002 | Barowski et al. |
| 2002/0056027 A1 | 5/2002 | Kanai et al. |
| 2002/0144054 A1 | 10/2002 | Fanning et al. |
| 2003/0126355 A1 | 7/2003 | David |
| 2003/0191880 A1 | 10/2003 | Lin |
| 2003/0229743 A1 | 12/2003 | Brown |
| 2003/0229762 A1 | 12/2003 | Maiyuran et al. |
| 2004/0024947 A1 | 2/2004 | Barth et al. |
| 2004/0024948 A1 * | 2/2004 | Winkler et al. ............... 710/311 |
| 2004/0049641 A1 | 3/2004 | So et al. |
| 2004/0064649 A1 | 4/2004 | Volpe et al. |
| 2004/0083341 A1 | 4/2004 | Robinson et al. |
| 2004/0088458 A1 | 5/2004 | Tomlinson et al. |
| 2004/0117606 A1 | 6/2004 | Wang et al. |
| 2004/0123043 A1 | 6/2004 | Rotithor et al. |
| 2004/0201647 A1 | 10/2004 | Jackson et al. |
| 2005/0081014 A1 | 4/2005 | Tran et al. |
| 2005/0138254 A1 | 6/2005 | Raghavan et al. |
| 2005/0216607 A1 | 9/2005 | Munguia |
| 2006/0041721 A1 | 2/2006 | Hakura et al. |
| 2006/0041722 A1 | 2/2006 | Hakura et al. |
| 2006/0041723 A1 | 2/2006 | Hakura et al. |
| 2006/0095677 A1 | 5/2006 | Hakura et al. |
| 2007/0198758 A1 | 8/2007 | Asano et al. |
| 2009/0055566 A1 | 2/2009 | Reinig et al. |
| 2009/0089477 A1 | 4/2009 | Reed |
| 2009/0228631 A1 | 9/2009 | Marulkar et al. |
| 2010/0057973 A1 | 3/2010 | Barake et al. |

OTHER PUBLICATIONS

"Battery Charging Specification", USB Implementation Forum Inc., Dated: Mar. 8, 2007, Pagesm1-29, Revision 1.0.

"Device Class Specification Adopters Agreement", Downloaded Circa: Mar. 10, 2007, pp. 1-5.

"Using Spin-Loops on Intel Pentium 4 Processor and Intel Xeon Processor". Version 2.1, May 2001. Order No. 248674-002. Retrieved from http://cache-www.intel.com/cd/00/00/01/76/17689_w_spinlock.pdf on Mar. 4, 2006.

Jason Fritts, "Multi-Level Memory Prefetching for Media and Stream Processing", Proceedings, 2002 IEEE International Conference on Multimedia and Expo, 2002. ICME '02. vol. 2, Aug. 26-29, 2002 pp. 101-104 vol. 2.

John Carter, et al., "Impulse: Building a Smarter Memory Controller". Proceedings, Fifth International Symposium on High-Performance Computer Architecture. Jan. 9-13, 1999 pp. 70-79.

Jouppi, N.P. "Improving direct-mapped cache performance by the addition of a small fully-associative cache and prefetch buffers", Proceedings. 17th Annual International Symposium on Computer Architecture, 1990. May 28-31, 1990 pp. 364-373.

* cited by examiner

HARDWARE SUPPORT SYSTEM FOR ACCELERATED DISK I/O

This application claims the benefit of commonly assigned U.S. Provisional Application "EFFICIENT I/O USING NDMA (ADMA)", Ser. No. 60/483,401, filed on Jun. 26, 2003, and which is incorporated herein in its entirety.

This application is related to following commonly assigned U.S. Patent Applications:

"A BYPASS METHOD FOR EFFICIENT DMA DISK I/O", by Danilak, R., Ser. No. 10/725,980, filed on Dec. 1, 2003, which is incorporated herein in its entirety;

"A METHOD AND SYSTEM FOR DYNAMIC BUFFERING OF DISK I/O COMMAND CHAINS", by Danilak et al., Ser. No. 10/726,151, filed on Dec. 1, 2003, which is incorporated herein in its entirety;

"A NOTIFIER METHOD FOR HANDLING DISK I/O COMMAND COMPLETION", by Danilak, R., Ser. No. 10/726,092, filed on Dec. 1, 2003, which is incorporated herein in its entirety; and "A METHOD AND SYSTEM FOR DYNAMIC APENDING OF DISK I/O COMMAND CHAINS", by Danilak, R., Ser. No. 10/726,049, filed on Dec. 1, 2003, which is incorporated herein in its entirety.

FIELD OF THE INVENTION

The field of the present invention relates to digital computer systems. More particularly, the present invention relates computer system I/O methods.

BACKGROUND OF THE INVENTION

A primary factor in the utility of a computer system is its speed in executing application programs. A high-performance computer system is expected to be responsive to user inputs and to accurately provide processed results within real-time constraints. A primary factor in the speed and responsiveness of a computer system is the efficiency of its processor subsystem, memory subsystem, I/O (input output) subsystem, and the like. Large investments have been made in the development of very high-speed processors and high-speed memory subsystems. Consequently, the computer industry has seen remarkable annual improvements in computer system performance. A comparatively new area of focus for improving computer system performance is the input output mechanisms involved in accessing and storing data.

Data is typically stored on attached hard disk drives. Disk drives having a size of 200 GB or more are increasingly common in desktop and laptop computer systems. Fast and efficient access to data stored on such drives is important to responsiveness and functionality of typical user applications.

ATA (AT Attachment) is a widely supported specification that defines methods of accessing data on disks. The ATA specification evolved from the earlier IDE (integrated drive electronics) specification. ATA defines a type of hardware interface that is widely used to connect data storage peripheral devices such as hard disk drives, CD-ROMs, tape drives, and the like, to a computer system. The ATA standard has further evolved to accommodate additional device types and data transfer features. For example, ATAPI (ATA Packet Interface) defines a version of the ATA standard for CD-ROMs and tape drives, ATA-2 (Fast ATA) defines the faster transfer rates used in Enhanced IDE (EIDE), and ATA-3 adds interface improvements, including the ability to report potential problems.

ATA devices have shown dramatic increases in data transfer speed and storage capacity over time. However, computer systems using such faster devices have not fully shown the expected performance improvements. A number of interface problems with computer system I/O components are partially responsible for the performance limitations, such as, for example, the data transfer characteristics of the PCI bus (e.g., due to the need to retain host adapter PCI compatibility), the interrupt based data transfer mechanisms, and the like.

The ADMA (Automatic DMA) specification comprises a new specification designed to improve the performance of ATA type devices. ADMA is designed to add features that improve the data transfer speed and efficiency of ATA devices. For example, ADMA adds support for multi-threading applications, command chaining techniques, command queuing, and the like, which are intended to have the overall effect of decoupling the host command sequence from the channel execution. ADMA attempted to address a number of inefficiencies with the earlier ATA specifications by implementing hardware level support for more modern data transfer mechanisms. The objective of the ADMA standard is to dramatically increase the performance of computer systems that operate with ATA type devices.

Problems remain, however, with respect to the manner in which the prior art ADMA controller architecture implements several of its supposed efficiency enhancing methods. One such problem is excessive disk startup latency. The excessive startup latency is due to the fact that the transfer of transaction information from the processor to system memory and then to the disk controller involves a number of arbitration and transfer operations on the buses linking the processor, system memory, and disk controller. These bus transactions can each incur two to four microseconds of latency. Another another startup latency problem is due to the fact that the disk controller does not start the disk drive mechanism to begin transaction until it has received the transaction information (e.g. via DMA transfer) from system memory.

Another problem is the manner in which additional disk transaction commands are queued for completion. The prior art ADMA specification implements a command chaining techniques in order to enable multiple disk I/O commands to be outstanding simultaneously. The prior art ADMA specification relies upon a system of memory locks to maintain the coherency of the pointers of a command chain (e.g., a CPB chain). The memory locks are implemented in order to ensure only one software process, or thread, can manipulate a CPB chain at a time. This can be very inefficient in a modern computer system having a modern, multithreaded, multiprocess software execution environment.

Another problem is the manner in which the computer system is notified of the completion of the pending disk I/O commands. The prior art ADMA specification relies on an interrupt servicing mechanism to notify the computer system of completed disk I/O commands. Unfortunately, the prior art interrupt servicing mechanism causes an excessive number of disk I/O interrupts. The excessive number of disk I/O interrupts imposes a substantial overhead burden on the computer system. For example, each interrupt servicing typically requires the computer system to switch context from its current process. Context switching consumes a significant number of CPU cycles.

Thus, the overhead problems of the prior art ADMA controller architecture can significantly detract from overall computer system performance. As processor and system memory performance continue to show annual improvement, it becomes increasingly important that disk I/O systems show similar improvements. As latency penalties are reduced in other components of a computer system (e.g., data transfer buses, graphics operations, etc.) it becomes increasingly important that the disk I/O system shows similar degrees of improvement in order to avoid imposing performance bottlenecks on the overall computer system.

SUMMARY OF THE INVENTION

Thus, what is required is a solution that can significantly reduce overhead experienced by the computer system during disk I/O. The required solution should provide significantly reduce processor overhead in comparison to prior art appending mechanisms.

In one embodiment, the present invention is implemented as a hardware support system for implementing accelerated disk I/O for a computer system. The system includes a bus interface for interfacing with a processor and a system memory of the computer system, a disk I/O engine (e.g., for a disk controller) coupled to the bus interface, and a device interface coupled to the disk I/O engine for interfacing the disk I/O engine with a disk drive. The disk I/O engine is configured to cause a start up of the disk drive upon receiving a disk start up command from the processor. The disk I/O engine is further configured to execute a disk transaction by processing the disk transaction information from a bypass register coupled to the disk I/O engine.

In one embodiment, the bus interface is configured to interface with the processor and the system memory of the computer system in accordance with a hyper transport protocol. The device interface can be configured to couple to a serial ATA disk drive, an ATA disk drive, or a legacy IDE disk drive. In one embodiment, the disk I/O engine is coupled to a completion status register configured to notify the disk I/O engine and indicate a completion of a pending disk I/O command. The disk I/O engine can be coupled to a CPB pointer buffer for extending a number of disk transactions scheduled for execution. Additionally, the disk I/O engine can be coupled to a chain memory for buffering a plurality of CPBs to extend to a number of disk transactions scheduled for execution by the disk I/O engine.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention.

Figure 1:
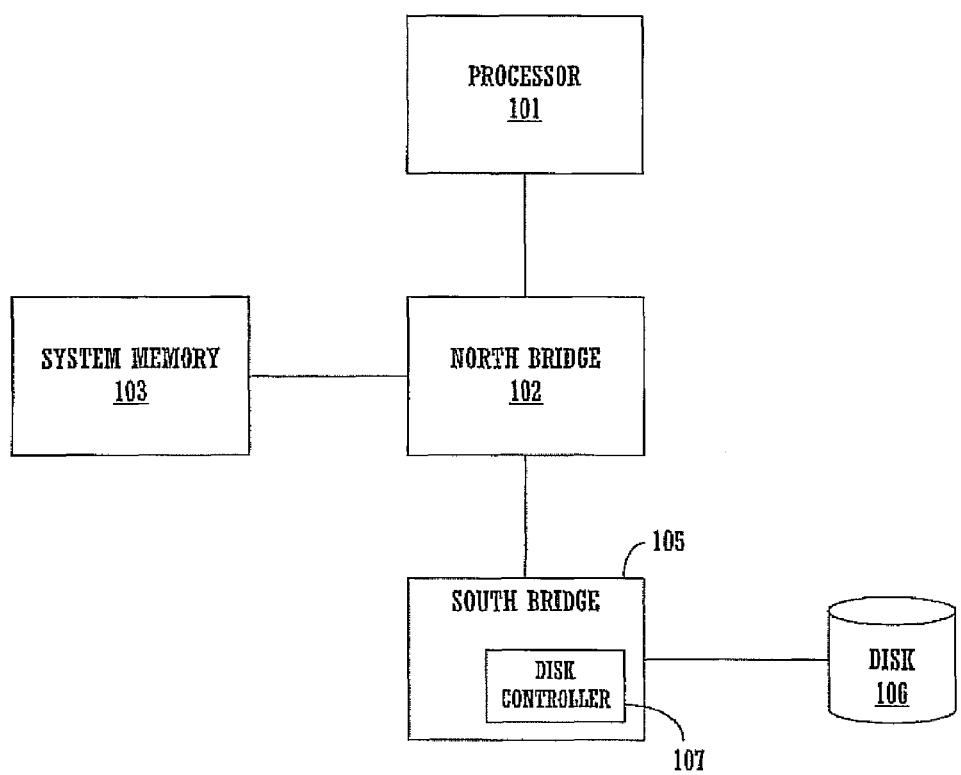
FIG. 1 shows a diagram depicting a computer system showing the basic components of a computer system platform that may be used to implement the functionality of embodiments of the present invention.

FIG. 1 shows a diagram depicting a computer system 100 showing the basic components of a computer system platform that may be used to implement the functionality of an embodiment of the present invention. The system 100 embodiment of FIG. 1 shows a general-purpose processor 101 (e.g., a CPU) coupled to system memory 103 via a memory controller 102

(e.g., North bridge). System 100 also shows a South bridge 105 coupled to a disk drive 106. In this embodiment, the South bridge 105 includes a disk controller 107 for controlling the disk drive 106.

Figure 8:
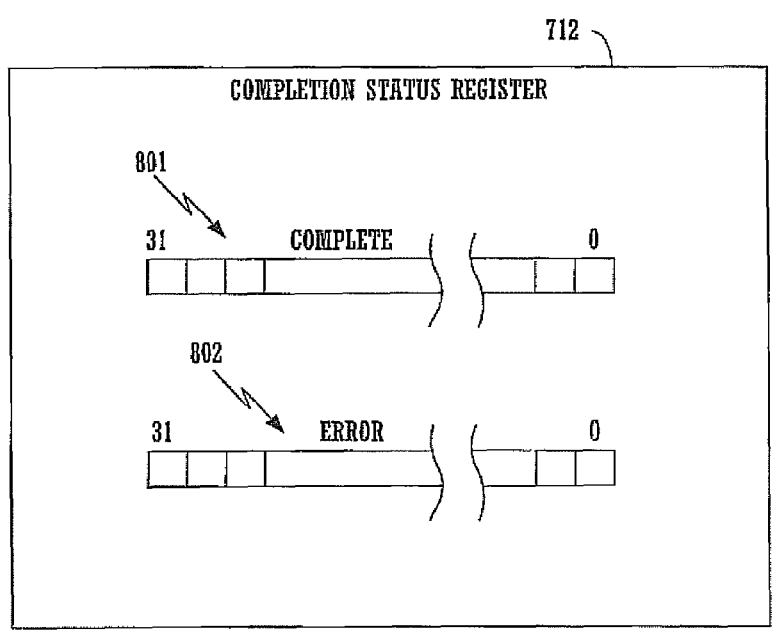
FIG. 8 shows a diagram of the completion status register in accordance with one embodiment of the present invention.

It should be noted that the computer system 100 embodiment shows one configuration of a computer system platform that can implement the functionality of the present invention. The specific configuration of a computer system in accordance with the present invention can change in accordance with specific requirements of a given application. For example, components can be included that add specialized peripheral buses (e.g., 1394, USB, etc.), network connectivity (e.g., Ethernet, Bluetooth, etc.), specialized graphics functions and graphics memory (e.g., high-performance graphics processor units, local graphics memory, etc.), I/O devices (e.g., keyboards, mice, etc.), and the like. Although the system 100 embodiment shows two bridge components (e.g., North bridge 102 and South bridge 105), system 100 can be implemented with a single bridge component, for example where the North bridge 102 and the South bridge 105 are combined. Similarly, the disk controller 107 can be a discrete component coupled to the South bridge 105 via a bus (e.g., as opposed to being integrated). An example of such an embodiment is shown in FIG. 8 below.

Accordingly, computer system 100 can function as the basic computer system platform for a laptop, desktop, or server computer system, or for a set-top gaming device such as, for example, an X-Box™ or similar gaming device or console. Additionally, it should be noted that the term CPU is used herein generally, and thus can be implemented as a number of different types of processors for a number of different types of computer system devices, such as, for example, an embedded processor, a graphics processor (e.g., specialized for performing graphics computations), a multiprocessor subsystem, and the like.

Figure 2:
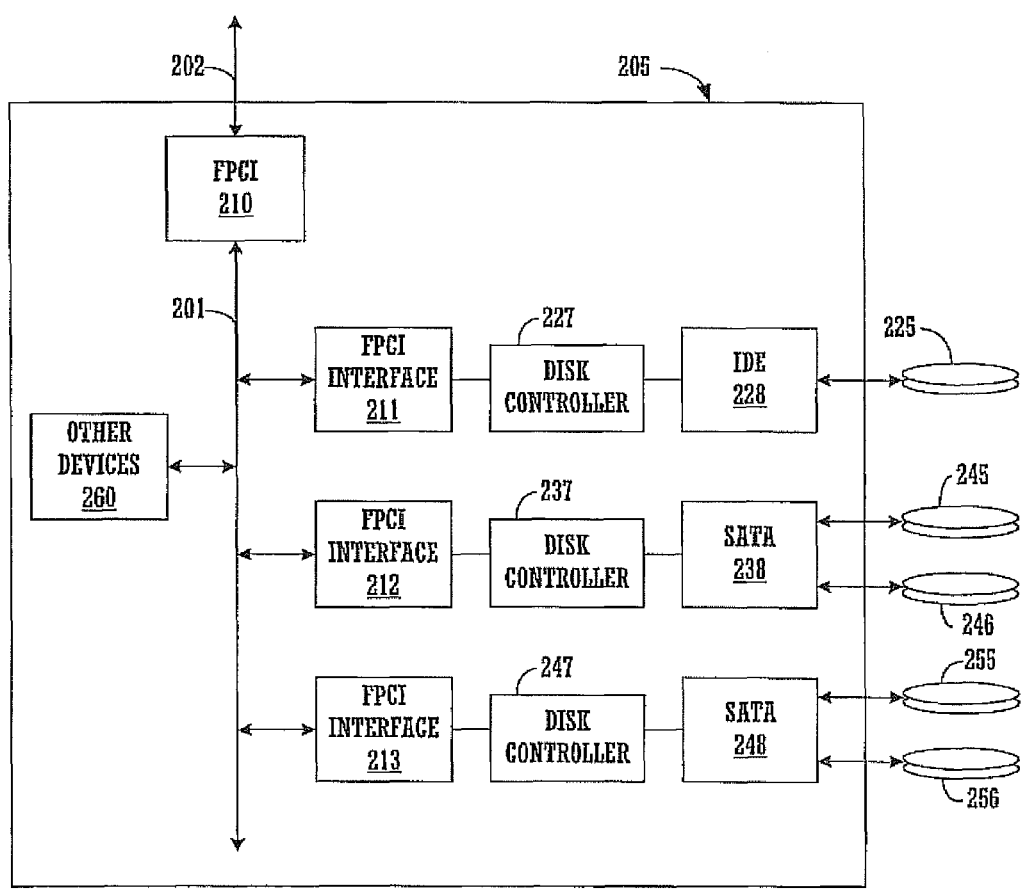
FIG. 2 shows a diagram illustrating a bridge component in accordance with one embodiment of the present invention.

FIG. 2 shows a diagram illustrating a bridge component 205 in accordance with one embodiment of the present invention. In this embodiment, the bridge component 205 includes three disk controllers 227, 237, and 247.

The bridge component 205 embodiment of FIG. 2 can be used to implement a South bridge (e.g., Southbridge 105) of a computer system. Data is transferred to and from the North bridge (e.g., North bridge 102) via a bus connection 202. This bus connection is typically a highly optimized high-speed bus (e.g., Hyper Transport, etc.) that links the North bridge chip with the Southbridge chip. The bus 202 is received by an on-chip bus interface unit 210. In this embodiment, the bus interface unit 210 is an FPCI unit that translates the data format of the bus 202 to an on-chip "FPCI" format for an on-chip bus 201. The FPCI format generally comprises a version of the industry-standard PCI format optimized for on-chip bus communication. The bus 201 couples to the FPCI interface components 211, 212, and 213. The FPCI interface components 211-213 interface respective disk controllers 227, 237, and 247 to the bus 201.

The bridge component 205 of the present embodiment includes the three disk controllers 227, 237, and 247. The disk controllers 237 and 247 are coupled to respective serial ATA controllers 238 and 248, which are coupled to the hard disks 245-246 and 255-256 as shown. The disk controller 227 is coupled to an IDE controller 228, which is coupled to the disk drives 225. Thus, the bridge component 205 embodiment, can support multiple serial ATA channels (e.g., serial ATA controllers 238 and 248) in addition to IDE channels (e.g., IDE controller 228) for legacy devices.

The disk controllers 227, 237, and 247 each comprise a disk controller architecture configured to provide the efficiency enhancing mechanisms of the present invention. The efficiency enhanced mechanisms will reduce the latency and overhead involved in disk transactions accomplished with any of the coupled disk drives.

It should be noted that the bridge component 205 of the present embodiment includes other devices 260 coupled to the internal bus 201. Such devices include, for example, components that add specialized peripheral buses (e.g., 1394, USB, etc.), network connectivity (e.g., Ethernet, Bluetooth, etc.), I/O devices (e.g., PS/2 keyboards, mice, etc.), and the like.

Figure 3:
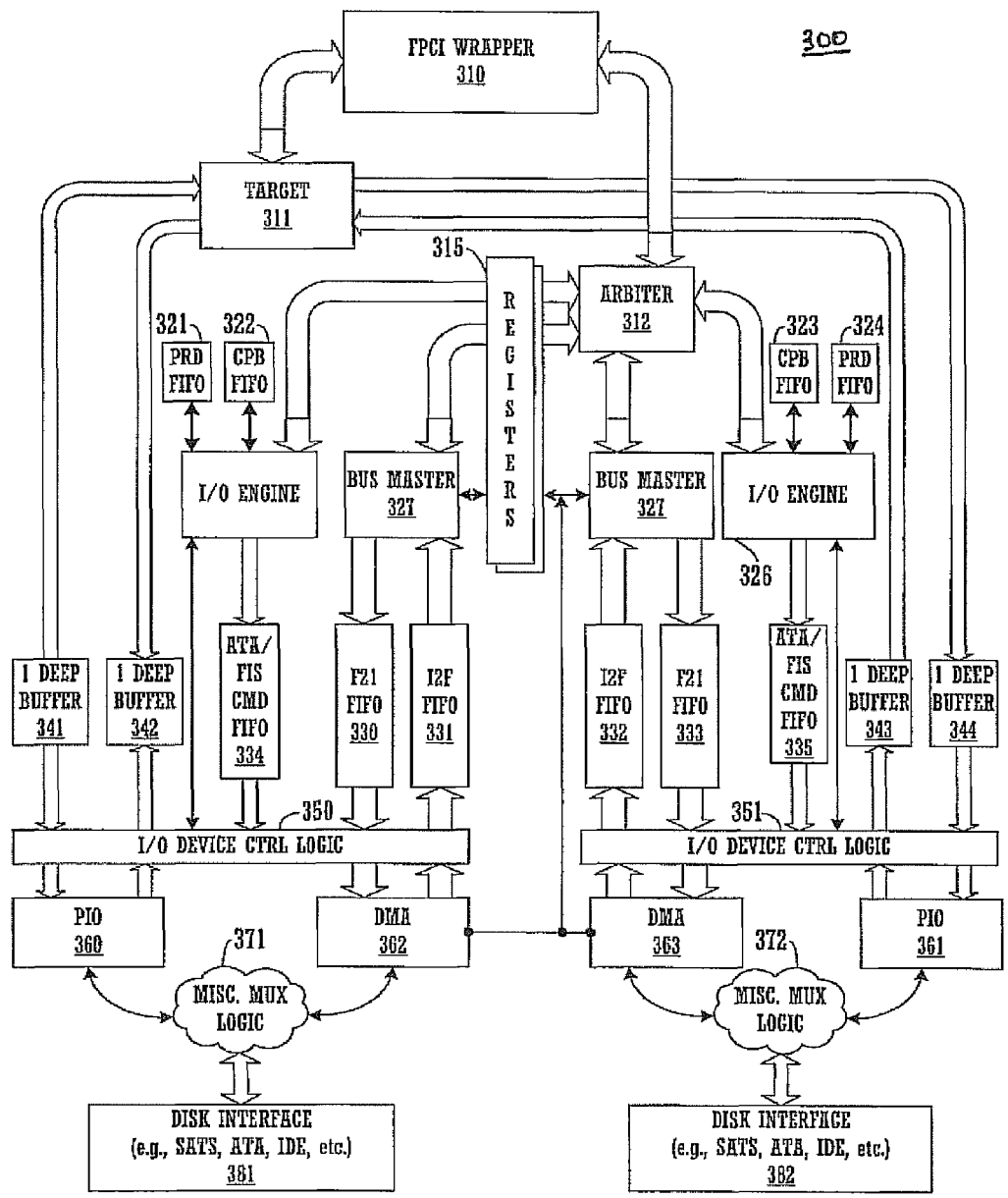
FIG. 3 shows a more detailed diagram of an exemplary architecture of a disk controller system in accordance with one embodiment of the present invention.

FIG. 3 shows a more detailed diagram of an exemplary architecture 300 of a disk controller system in accordance with one embodiment of the present invention. The architecture 300 shows the internal components comprising an FPCI interface and a disk controller in accordance with one embodiment of the present invention.

In the FIG. 3 embodiment, the interface (e.g., FPCI interface 213) to the FPCI bus (e.g., FPCI bus 201 of FIG. 2) is provided by the components 310-312. The FPCI wrapper 310 functions by stripping arriving data of its FPCI format elements and by adding such FPCI format elements to departing data. The target functions as an FPCI agent on the internal FPCI bus 201 (shown in FIG. 2). Transactions are directed to the disk controller components of architecture 300 via the target 311. The arbiter 312 arbitrates for access to the internal FPCI bus 201 to implement incoming and outgoing data transfers. Thus, in the present embodiment, the components 310-312 comprise an FPCI interface as described above in the discussion of FIG. 2.

The architecture 300 embodiment includes a set of registers 315 for storing data for transmission to the computer system and for receiving data transmitted from the computer system (e.g., via the FPCI wrapper 310). In one embodiment, the registers 315 are configured to implement a bypass function for enhancing efficiency of disk transactions. The registers 315 are coupled to the bus masters 327 and 328, and I/O engines 325 of 326. The bus masters 327-328 control the access of the respective I/O engines 325-326 to the registers 315 and to the overall computer system.

The I/O engines 325 and 326 implement the disk transaction methodology of the present invention. The I/O engines 325-326 contain logic that controls the manner in which disk transactions are queued, executed, and resulting data is transferred to and from the computer system. The FIFOs 330-331 and 332-333 are for temporary storage of the data going to the disk drives and coming from the disk drives (e.g., as shown by the arrows). The FIFOs 334 and 335 are for queuing disk I/O commands for execution by the I/O engines 325 and 326. The FIFOs 321-324 are for temporary storage of PRD and CPB commands for use by the I/O engines 325-326. The device control logic 350 and 351 operates under the control of the I/O engines 325-326 and are for interfacing with and controlling the coupled devices (e.g., the hard drives) via the PIO engines 360-361 or the DMA engines 362-363.

The buffers 341-344 (e.g., 1 deep buffers) are for temporary storage of data for use during certain programmed I/O (PIO) modes. This data is used by the PIO engines 360 and 361 via the device control logic 350-351. Miscellaneous multiplexing logic 371-372 couples the disk interface 381 and the disk interface 382. As shown in FIG. 3, the disk interfaces 381-382 can comprise logic required to implement SATA interfaces, ATA interfaces, or IDE interfaces. For example, in the case of a SATA interface, the interfaces 381-382 would include components for serializing the data for transactions with the coupled disks.

Figure 4:
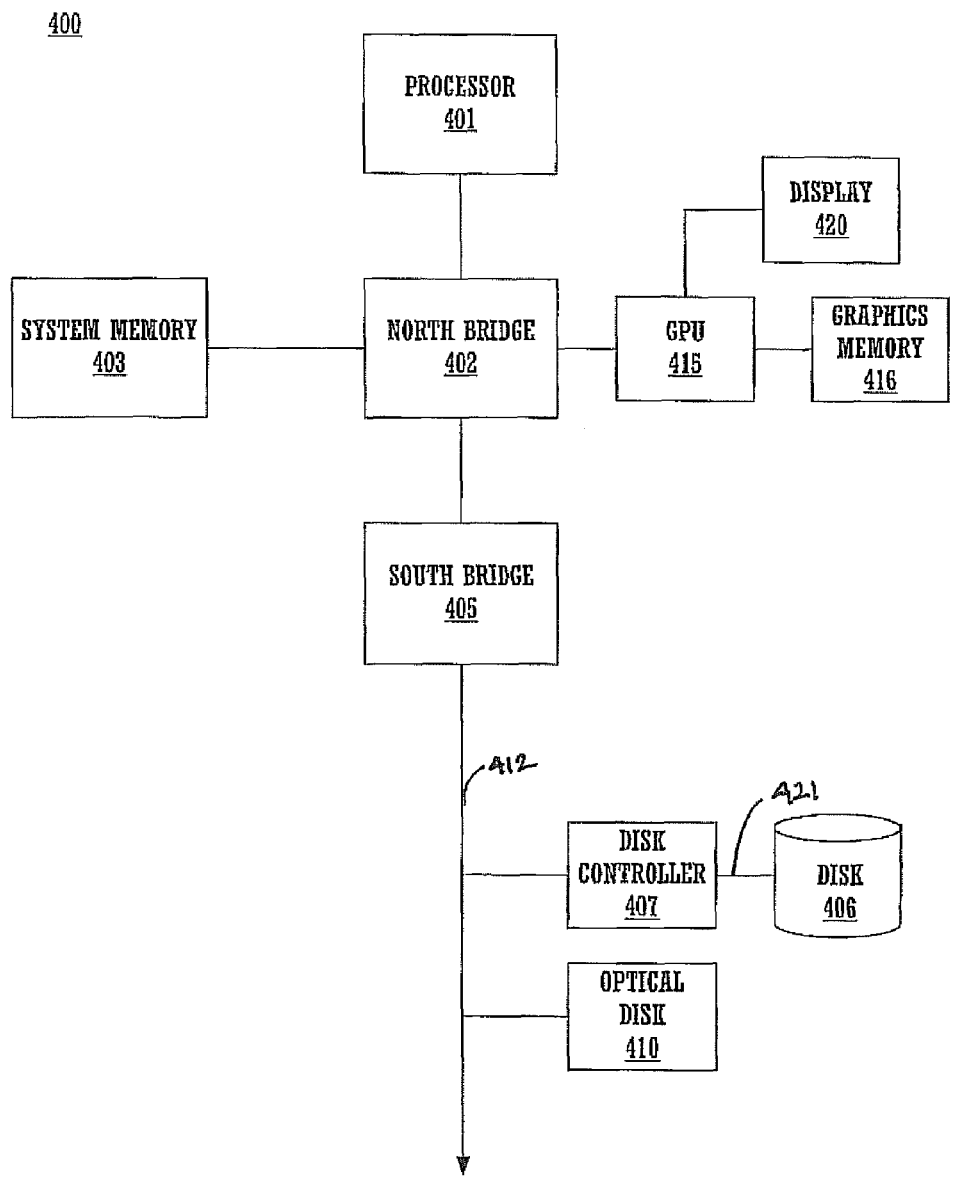
FIG. 4 shows a diagram of a computer system in accordance with an alternative embodiment of the present invention.

FIG. 4 shows a diagram of a computer system 400 in accordance with an alternative embodiment of the present invention. Computer system 400 is substantially similar to computer system 100 of FIG. 1. Computer system 400 shows a discrete GPU 415 (graphics processor unit) and a discrete disk controller 407. The computer system 400 includes a general-purpose CPU 401 coupled to a system memory 403 via a memory controller 402 (e.g., North bridge). In this embodiment, a South bridge 405 is coupled to a discrete disk drive controller 407 and an optical disk 410 (e.g., DVD ROM, CD ROM, etc.) via a bus 412. The disk controller 407 is coupled to a hard disk drive 406. The system 400 embodiment also includes a GPU 415 coupled to drive a display 420. The GPU 415 is coupled to its local graphics memory 416.

In one embodiment, the disk drive 406 is in accordance with a version of the ATA specification. For example, the disk drive 406 can be a Serial ATA (e.g., SATA) disk drive and the bus 421 can be a Serial ATA bus. Alternatively, the disk drive 406 can be an ATA disk drive coupled to the disk controller 407 via an ATA 100 bus, ATA 133 bus, etc. (e.g., parallel ATA buses).

As with computer system 100 of FIG. 1, computer system 400 can include additional components in accordance with specific requirements of a given application. Such components include, for example, specialized peripheral buses (e.g., 1394, USB, etc.), network connectivity (e.g., Ethernet, Bluetooth, etc.), and the like.

Bypass Embodiments:

A bypass method as implemented by a disk controller architecture accordance with embodiments of the present invention are now described. Referring again to FIG. 1, in one embodiment, system 100 functions by implementing a bypass method for executing disk I/O (e.g., reading/writing data to the disk drive 106). As used herein, the term bypass refers to the manner in which the present invention bypasses the prior art ATA step of writing to a set of 8-bit registers in the disk controller to implement a disk transaction. In the system 100 embodiment, a disk transaction begins with the processor 101 issuing a command to start up the disk drive mechanism of the disk drive 106. By issuing the start up command upfront, at the beginning of the disk transaction, system 100 can immediately begin the start up of the disk drive mechanism. As is generally known, the start up delay of the disk drive mechanism can be typically four to six microseconds.

The processor 101 uses the start up delay to build, or prepare, disk transaction information. Once the start up command is issued by the processor 101 to the disk controller 107, the processor 101 uses the start up delay time to prepare the disk transaction information by packaging a plurality of data structures comprising the disk transaction. As known by those skilled in the art, such data structures include, for example, CPBs (command parameter blocks) and PRDs (physical region descriptors) for the data transaction. A CPB is a DMA data structure that describes a command to be executed by the disk I/O engine. A PRD is a DMA data structure that describes areas of host memory (e.g., system memory 103) that are used during data transfer.

The processor 101 subsequently transfers the disk transaction information (e.g., including the PRD data structures and the CPB data structures) to the disk controller 107. In the present system 100 embodiment, this involves the processor 101 communicating with the North bridge 102 and subsequently communicating with the South bridge 105. The disk transaction information is transferred across the buses coupling the processor 101, the North bridge 102, South bridge 105, and the disk controller 107.

The disk controller 107 then implements the disk transaction once it has received the disk transaction information. As described above, the disk drive mechanism of the disk drive 106 was previously started by a command received from the processor 101. By the time the disk transaction information has been received from the processor 101, a significant amount of the start up latency of the disk drive 106 will have occurred. Consequently, the disk transaction can be implemented by the disk controller 107 much sooner in comparison to the prior art.

For example, in the prior art ADMA method, the start up command is not issued to the disk drive 107 until the disk transaction information has been retrieved by the disk controller 107. In contrast, in accordance with embodiments of the present invention, the start up command is issued prior to the packaging of the disk transaction information or the receiving of the disk transaction information by the disk controller 107, thereby hiding a significant amount of the start up latency from the processor 101 and other components of the computer system 100.

Figure 5:
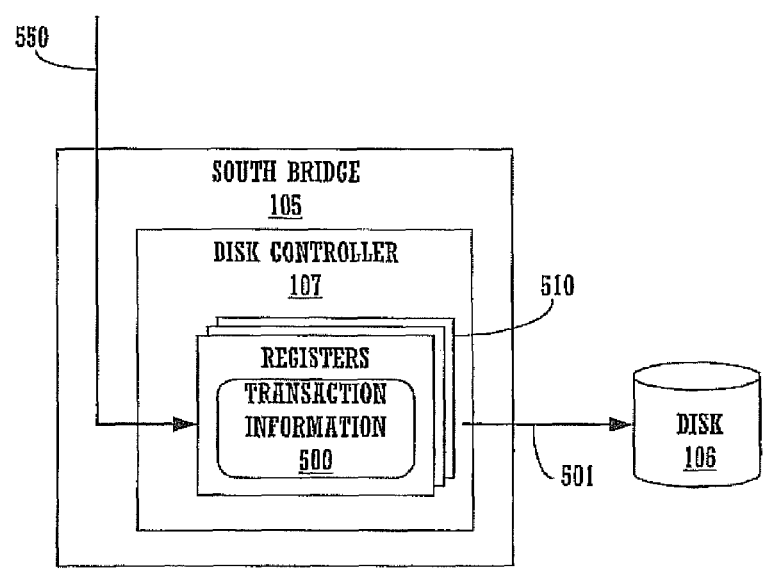
FIG. 5 shows a diagram illustrating the disk controller having the transaction information stored within an internal memory in accordance with one embodiment of the present invention.

Referring now to FIG. 5, FIG. 5 shows a diagram illustrating the disk controller 107 having the transaction information 500 stored within an internal memory in accordance with one embodiment of the present invention.

In the disk controller 107 embodiment of FIG. 5, a set of bypass registers 510 (e.g., similar to the registers 315 of FIG. 3) comprise the internal memory for storing the transaction information 500. As described above, the disk transaction information 500 is transferred from the processor 101 to the disk controller 107. The disk transaction information 500 is then stored within a set of memory mapped bypass registers 510 of the disk controller 107. In the controller 107 embodiment, these registers are 64 bits long (in comparison to the prior art 8 bit registers) and function by aggregating the transaction information through a memory mapped data transfer from the processor 101. The memory mapped registers provide a much more efficient data transfer in comparison to the prior art (e.g., I/O mapped registers). It should be noted that other bypass register configurations can be used (e.g., 32 bits, 48 bits, 128 bits, etc.).

The disk transaction information 200 is transferred to the disk controller 107 across a bus 550. As described above, in one embodiment, the bus 550 includes the bus linking the North bridge 102 and the South bridge 105 (e.g., as shown in FIG. 1). In the present embodiment, the disk controller 107 is integrated within the South bridge 105.

Once the disk controller 107 has the transaction information 500, the disk controller 107 is in possession of the information it needs to implement the disk transaction. The disk controller 107 then executes the disk transaction with the disk drive 106 via the bus 501.

In the present embodiment, the disk drive 106 is in accordance with a version of the ATA specification. For example, the disk drive 106 can be a Serial ATA (e.g., SATA) disk drive and the bus 201 can be a Serial ATA bus. Alternatively, the disk drive 106 can be an ATA disk drive and the bus 201 can be an ATA 100, ATA 133, etc. bus (e.g., a parallel ATA bus).

Figure 6:
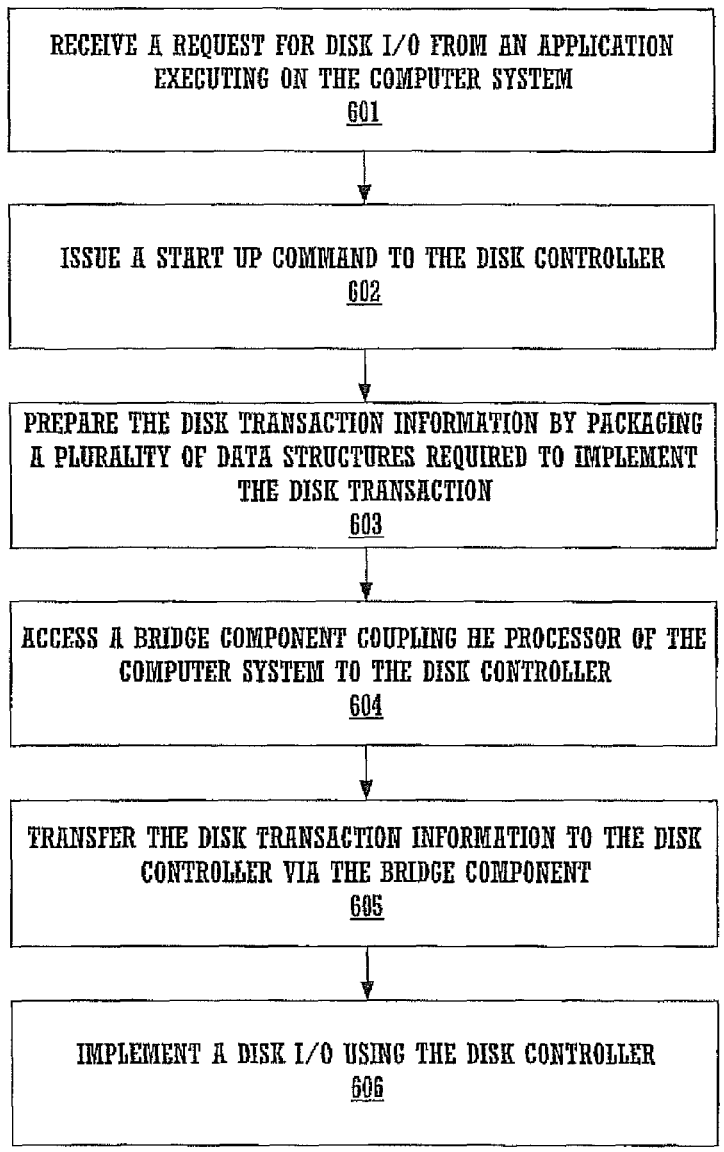
FIG. 6 shows a flowchart of the steps of a process in accordance with one embodiment of the present invention.

FIG. 6 shows a flowchart of the steps of a process 600 in accordance with one embodiment of the present invention. Process 600 shows the steps involved in a bypass disk I/O method as implemented by a computer system (e.g., computer system 100 of FIG. 1).

Process 600 begins in step 601, where a request is received for disk I/O from an application executing on the computer system. The application can be, for example, and operating system, a user application executing on top of the operating system, a device driver, or the like. In step 602, upon receiving the request for disk I/O, the CPU (e.g., processor 101) of the computer system issues a start up command to the disk controller (e.g., disk controller 107).

In step 603, the processor then prepares the disk transaction information by packaging a plurality of data structures required to implement the disk transaction. As described above, the start up command is first issued in order to begin the process of starting up the disk drive mechanism. This has the effect of reducing the amount of latency experienced by the processor. As the disk drive mechanism is starting up, the processor prepares the disk transaction information.

In step 604, the processor accesses a bridge component (e.g., South bridge 105) that couples to the disk controller. As described above, this bridge component controls the bus coupling the disk controller to the computer system. Depending upon the configuration of the computer system, the disk controller can be integrated within the bridge component or can be a discrete component coupled to the bridge component via a bus (e.g., PCI bus).

In step 605, the disk transaction information is transferred to the disk controller via the bridge component. As described above, the disk transaction information is stored within internal memory (e.g., memory mapped registers) of the disk controller. Subsequently, in step 606, the disk controller implements the disk I/O.

In this manner, the bypass method embodiments of the present invention provide a number of improvements over the prior art. For example, the start up command immediately begins the start up process of the disk drive mechanism at the beginning of a disk I/O process. This has the effect of significantly hiding the disk drive start up latency. Additionally, the disk transaction information is pushed from the processor to the disk controller. This has the effect of reducing the latency and overhead involved in accessing, arbitrating for control of, and transferring data across the buses coupling the processor to system memory (e.g., system memory 103) and the disk controller. For example, in the prior art (e.g., the ADMA specification), the processor accesses system memory to build transaction information, pushes a pointer to the system memory location to the disk controller, and requires the disk controller to access and retrieve the transaction information from the system memory, thereby requiring a greater number of arbitration and data transfer cycles.

Figure 7:
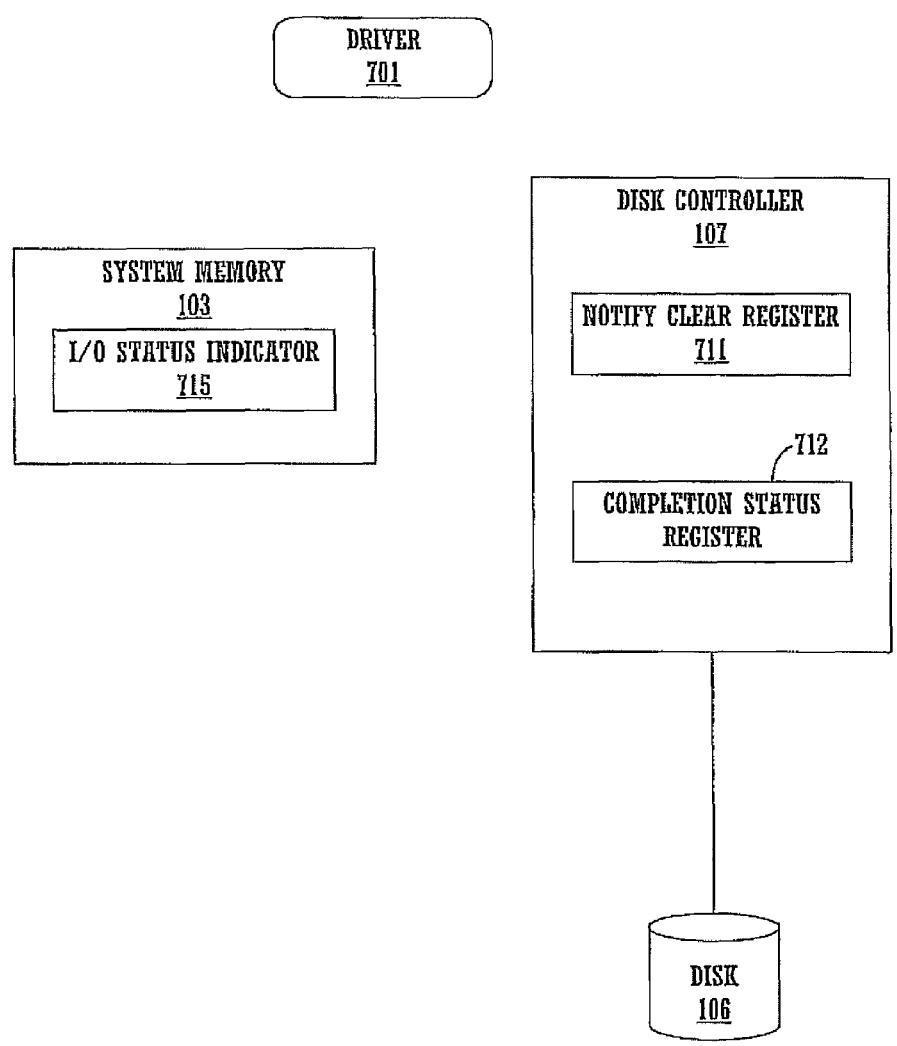
FIG. 7 shows a diagram of the disk controller and the disk drive with respect to the system memory in accordance with one embodiment of the present invention.

Notifier Embodiments:

A Notifier method as implemented by a disk controller architecture accordance with embodiments of the present invention is now described. FIG. 7 shows a diagram of the disk controller 107 and the disk drive 106 with respect to the system memory 103 in accordance with one embodiment of the present invention. As illustrated in FIG. 7, the disk controller 107 includes a notifier clear register 711 and a completion status register 712. The system memory 103 includes an I/O status indicator 715. A driver 701 is also shown (e.g., executing on the processor 101).

The system 100 embodiment of FIG. 7 illustrates the interaction of the notifier clear register 711, the completion status register 712, and the I/O status indicator 715 during a disk I/O command completion process. The process typically begins with the completion of one or more outstanding disk I/O commands by the disk drive 106. In the present embodiment, the disk controller 107 is configured to support multiple outstanding disk I/O commands for the disk drive 106. The system 100 embodiment of FIG. 7 functions in part by notifying the computer system when one or more of the outstanding I/O commands (e.g., commands that are queued, or chained together, for successive completion) successfully finish executing.

When a disk I/O command successfully completes, an indication of the completion, or a completion signal, is sent to the disk controller 107. This indication causes the completion status register 712 to be updated to reflect the newly completed disk I/O command.

In one embodiment, the completion status register comprises a 32-bit register. Each bit of the 32-bit register corresponds to the status of a disk I/O command. For example, if an outstanding disk I/O command completes, the resulting indication causes its corresponding bit of the 32-bit register to be set to reflect the completion (e.g., set to logical one). Similarly, if the outstanding disk I/O command has yet to successfully complete, it's corresponding bit of the 32-bit register can reflect the noncompletion (e.g., set to logical zero). Hence, a 32-bit completion status register can track 32 outstanding disk I/O commands, a 16-bit completion status register can track 16 outstanding disk I/O commands, and the like.

When the completion status register 712 is updated to show the completion of the outstanding disk I/O command, the disk controller 107 accesses the I/O status indicator 715 in system memory 103 and updates the I/O status indicator 715 in accordance with the completion status register 712. In the present embodiment, this is accomplished by the disk controller 107 accessing system memory 103 and performing a DMA write to the I/O status indicator 715. For example, if the completion status register 712 shows commands 1-3 complete (e.g., the corresponding bit positions are one), the I/O status indicator 715 will be correspondingly updated.

In this manner, the I/O status indicator 715 comprises a data structure in system memory 103 configured for tracking the corresponding bit positions of the completion status register 712. For example, in a case where the completion status register 712 is a 32-bit register, the I/O status indicator 715 can be a four byte (e.g., 32-bit) data word stored in the system memory 103. In such an embodiment, the four byte data word would function as a "bit mask" where bits of the data word are set to correspond to their corresponding bits in the completion status register 712.

When the I/O status indicator 715 is updated to show the completion of the outstanding I/O disk command, the disk controller 107 asserts an interrupt to the computer system 100 (e.g., to the processor 101). The interrupt signals the computer system that the disk I/O command has completed and, for example, the requested disk information is ready for processing. When the interrupt is received by the processor 101, the processor suspends and saves any currently executing software context and invokes specialized interrupt handling software code. This code performs the steps necessary to recognize the interrupt as a disk I/O (e.g., polling attached hardware devices, etc.) and in turn, invokes a disk I/O software driver, shown in FIG. 7 as the driver 701. The disk I/O driver 701 then executes the steps necessary for the computer system to process the completed disk I/O. The driver 701 reads the I/O status indicator 715, discovers which disk I/O commands are complete, and then executes the steps necessary to utilize the resulting data.

The system 100 embodiment advantageously uses the time period between the assertion of the interrupt by the disk controller 107 and the processing of the completed disk I/O by the software driver 701. As known by those skilled in the art, a significant amount of time can elapse between the assertion of the interrupt by the disk controller 107 as described above, and the invocation and execution of the driver 701. Additionally, this delay can vary widely depending upon the current state of the computer system. A typical range, for example, varies from two microseconds to 30 microseconds or more. The system 100 embodiment therefore continues to receive disk I/O command completion indications as they are generated by, for example, the disk drive 106. These newly completed disk I/O commands update the completion status register 712, and are subsequently used by the disk controller 107 to update the I/O status indicator 715.

Thus, even though the interrupt has been asserted by the disk controller 107, newly completed disk I/O commands can still be written into the I/O status indicator 715. In this manner, the system 100 embodiment continues to update the I/O status indicator 715 with respect to newly completing disk I/O commands up until the actual software code comprising the driver 701 starts to execute and the I/O status indicator 715 is read by the driver 701.

Referring still to FIG. 7, once the driver 701 reads the I/O status indicator 715, the driver 701 clears the I/O status indicator 715 with respect to any I/O completions it sees. For example, if bit positions in the I/O status indicator 715 indicate disk I/O commands 1-3 are complete, the status indicator 715 will clear the bit positions 1-3 and process their corresponding I/O commands.

The driver 701 then accesses the disk controller 107 and updates a notifier clear register 711 to indicate which disk I/O commands it saw and processed (e.g., which bit positions it cleared in the I/O status indicator 715). The notifier clear register 711 thus functions by tracking which bit positions of the I/O status indicator 715 were cleared by the driver 701. For example, if the driver 701 cleared the bit positions 1-3 of the I/O status indicator 715, corresponding bit positions 1-3 of the notifier clear register 711 will be set.

The notifier clear register 711 is then used to update the completion status register 712 as to which of the disk I/O command completions were seen and processed by the driver 701. In this manner, embodiments of the present invention track which disk I/O command completions are seen by the driver 701. This tracking ability enables the I/O status indicator 715 to be continually updated with new disk I/O command completions in the manner described above, even after the assertion of the interrupt by the disk controller 107.

In one embodiment, a subsequent interrupt is asserted by disk controller 107 to inform the processor 101 of any disk I/O command completions that were not seen by the driver 701. This will lead to a new invocation of the driver 701 which will then read the I/O status indicator 715 in pickup any "late arriving" updates (e.g., updates to the I/O status indicator 715 after it is read by the driver 701) from the completion status register 712. It should be noted that once the subsequent interrupt is asserted, the I/O status indicator 715 can be updated with newly completing disk I/O commands in the manner described above.

In this manner, the I/O status indicator 715 can be updated asynchronously with respect to the software executing on the processor 101. The asynchronous updating aspects of the embodiments of the present invention greatly reduce the performance penalties incurred by the computer system due to both the latency in servicing disk I/O interrupts and the overhead involved in servicing the interrupts.

In one embodiment, the I/O status indicator 715 can be predictively updated. In such an embodiment, the disk controller 107 can predictively assert an interrupt before a completion status indication is received. For example, the disk controller 107 can be aware of a pending disk I/O command. This awareness can enable the disk controller 107 to predictively assert the interrupt in anticipation of receiving the completion status indication. If the interrupt is asserted too early, for example, the driver 701 will simply see an empty I/O status indicator 715 and ignore it. Thus, the process of invoking the driver 701 can be started prior to receiving the completion indications, updating the completion status register 712, or updating the I/O status indicator 715. This provides the advantage of further hiding the start up latency involved in running the driver 701.

With the predictive interrupt assertion embodiment, algorithms can be used to customize the timing of the predictive interrupt assertion. For example, in those cases where the predictive interrupt assertion is consistently too early or to late, the predictive assertion can be adjusted to yield a more optimal match.

FIG. 8 shows a diagram of the completion status register 712 in accordance with one embodiment of the present invention. As depicted in FIG. 8, the completion status register 712 of the present embodiment includes a 32-bit completion register 801 and a corresponding 32-bit error register 802. In the present embodiment, the bit positions of the 32-bit completion register 801 indicate the status of a corresponding disk I/O command and the bit positions of the 32-bit error register 802 indicate whether the corresponding disk I/O command completed successfully or resulted in an error.

It should be noted that although the completion register 801 and the error register 802 are implemented as 32-bit registers, registers of different lengths can be used (e.g., 16 bits, 24 bits, 40 bits, etc.). Similarly, it should be noted that although the FIG. 8 embodiment has a separate completion register 801 and a separate error register 802, the functionality of the registers 801-802 can be combined into a single register.

Figure 9:
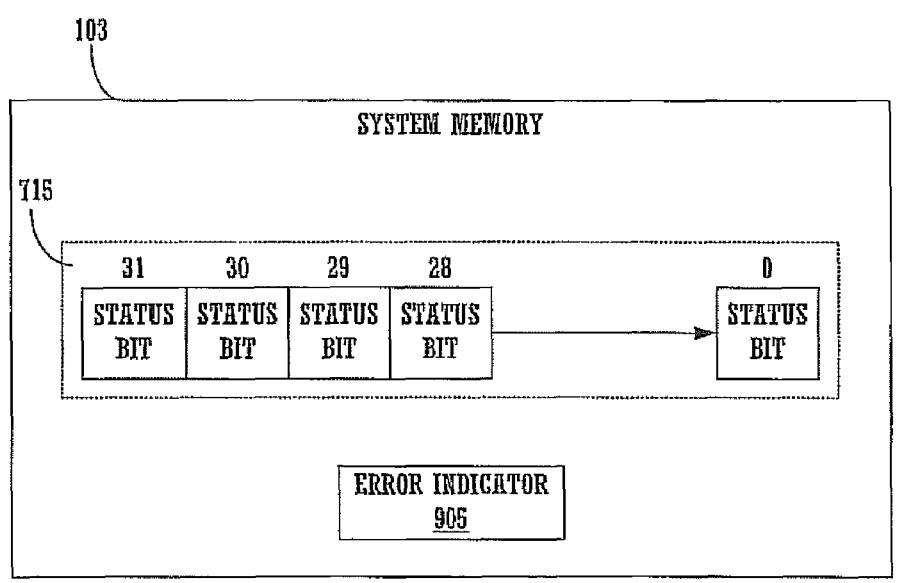
FIG. 9 shows a diagram of the I/O status indicator in accordance with one embodiment of the present invention.

FIG. 9 shows a diagram of the I/O status indicator 215 in accordance with one embodiment of the present invention. As depicted in FIG. 4, the I/O status indicator 215 comprises a four byte, 32-bit, data structure where the bit positions (e.g., 31-0) indicate the status of corresponding disk I/O commands. Thus, for example, the I/O status indicator can be implemented as an address in system memory 103 for the four byte data structure.

FIG. 9 also shows an error indicator 905 within the system memory 103. In the present embodiment, the error indicator 905 functions as an error/exception indicator that that provides information as to whether some error occurred during the processing of one or more I/O commands. In one embodiment, the error indicator 905 is implemented as a 32 bit word that can provide information regarding the cause of an error (e.g., as opposed to a bit-mask that simply indicates the presence of an error). The error indicator 905 is an indication for software that some anomalous condition occurred and the software should figure out what happened.

For example, in one embodiment, when the error indicator 905 is 0 (e.g., no error), software can just process the completed command and does not need to worry about any errors or exceptions. When the error indicator 905 is non-zero, then software must interrogate the disk controller 107 and handle the error or exception. It should be noted that the error indicator 905 can be non-zero even if there are no commands to complete. This can occur, for example, in a case where the disk is unplugged. Thus, in one embodiment, the value of the error/exception has been logically or-ed with respect to all possible error and exception sources. Consequently, the value of the error indicator 905 can be quite different from the value of the error indicator 802 of the completion status register in the disk controller 107.

Figure 10:
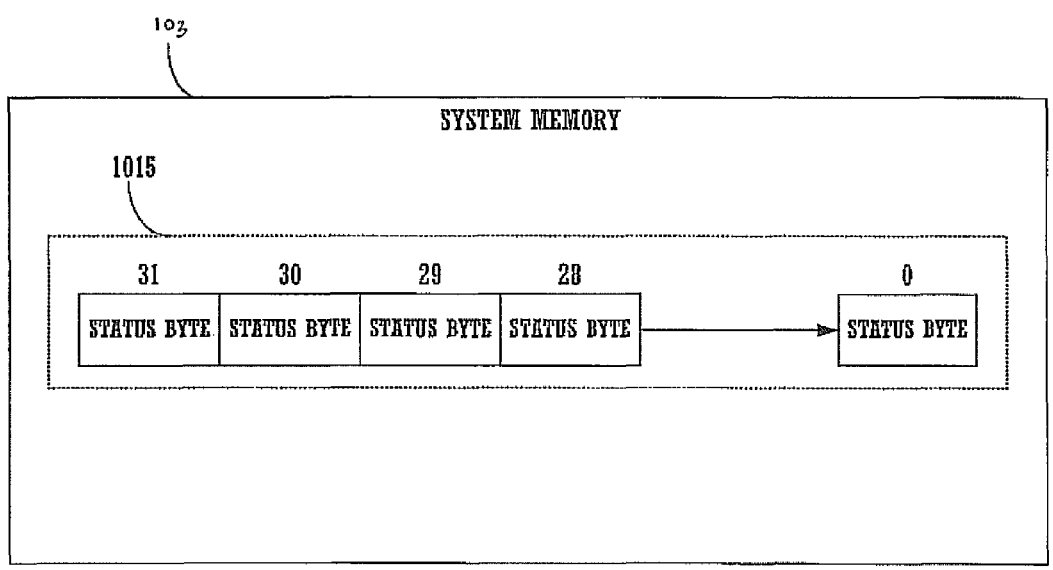
FIG. 10 shows a diagram of the I/O status indicator in accordance with an alternative embodiment of the present invention.

FIG. 10 shows a diagram of the I/O status indicator 1015 in accordance with an alternative embodiment of the present invention. In this embodiment, the I/O status indicator 1015 utilizes one byte for each corresponding disk I/O command, as opposed to one bit for each command (e.g., as with the I/O status indicator 715 of FIG. 9). Thus, the I/O status indicator 1015 uses 32 bytes to keep track of up to 32 disk I/O commands. In comparison to the I/O status indicator 715 embodiment, the indicator 1015 embodiment uses more memory. However, in general, typical computer systems are much more efficient at manipulating bytes of data as opposed to individual bits of data. Hence, for example, the computer system 100 can clear bytes corresponding to recognized disk I/O command completions much faster than clearing individual corresponding bits.

Figure 11:
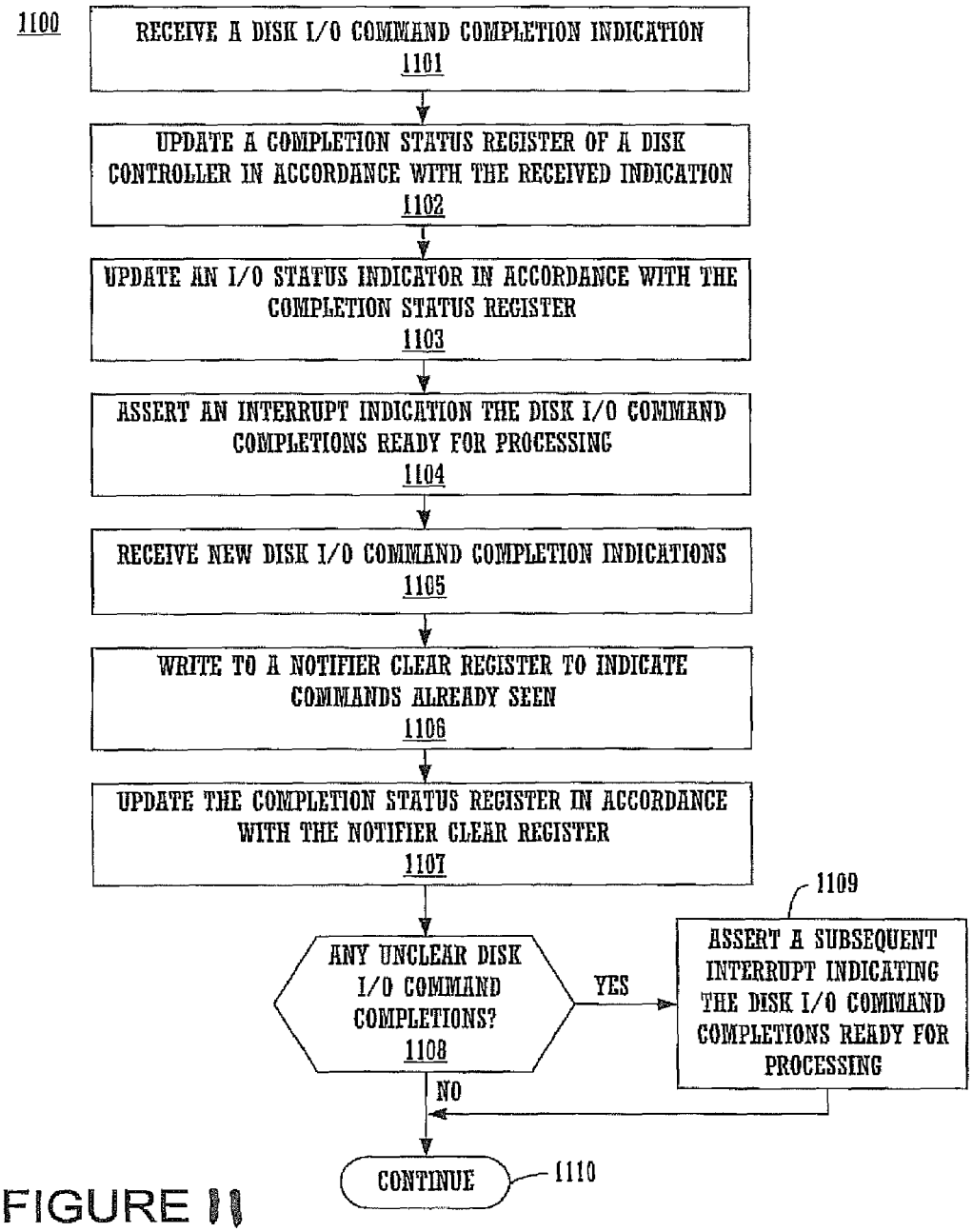
FIG. 11 shows a flowchart of the steps of a process in accordance with one embodiment of the present invention.

FIG. 11 shows a flowchart of the steps of a process 1100 in accordance with one embodiment of the present invention. Process 1100 shows the basic operating steps performed by a computer system (e.g., computer system 100 of FIG. 1) performing a notifier method for handling disk I/O command completions.

Process 1100 begins in step 1101 where a disk I/O command completion indication is received. As described above, the disk I/O command completion indicates a command has been executed (e.g., by the disk drive) and is ready for subsequent processing. In step 1102, a completion status register (e.g., completion status register 712 of FIG. 7) is updated in accordance with the received indication. In step 1103, an I/O status indicator (e.g., I/O status indicator 715) is updated in accordance with the completion status register. As described above, the updating is performed through a DMA access by the disk controller (e.g., disk controller 107).

In step 1104, an interrupt is asserted indicating one or more disk I/O command completions are ready for processing by the computer system. In step 1105, the disk controller determines whether new disk I/O command completion indications are received. In step 1106, a write is performed to the notifier clear register to indicate which commands have already been seen. In step 1107, the completion status register is updated in accordance with the notifier clear register.

In step 1108, the disk controller determines whether any uncleared disk I/O command completions remain within the completion status register. As described above, updates to the notifier clear register indicate the driver (e.g., driver 701) has processed the I/O status indicator, and thereby recognized any disk I/O completions indicated therein. The notifier clear register is used to update the completion status register as shown in step 1107. Thus, as described above, any remaining uncleared disk I/O command completions in the completion status register represent command completions that have not been processed by the driver.

Thus, in step 1109, if uncleared disk I/O command completions exist, a subsequent interrupt is asserted indicating the disk I/O command completions that are ready for processing. Otherwise, process 1100 proceeds to step 1110 and continues as indicated, waiting for the reception of any disk I/O command completion indications as shown in step 1101.

Thus, embodiments of the present invention significantly reduce latency experienced by the processor (e.g., CPU) of the computer system while waiting for hard disk I/O commands to complete. Additionally, embodiments of the present invention significantly reduce latency, processor overhead, and the like required to implement disk I/O in comparison to the prior art.

Figure 12:
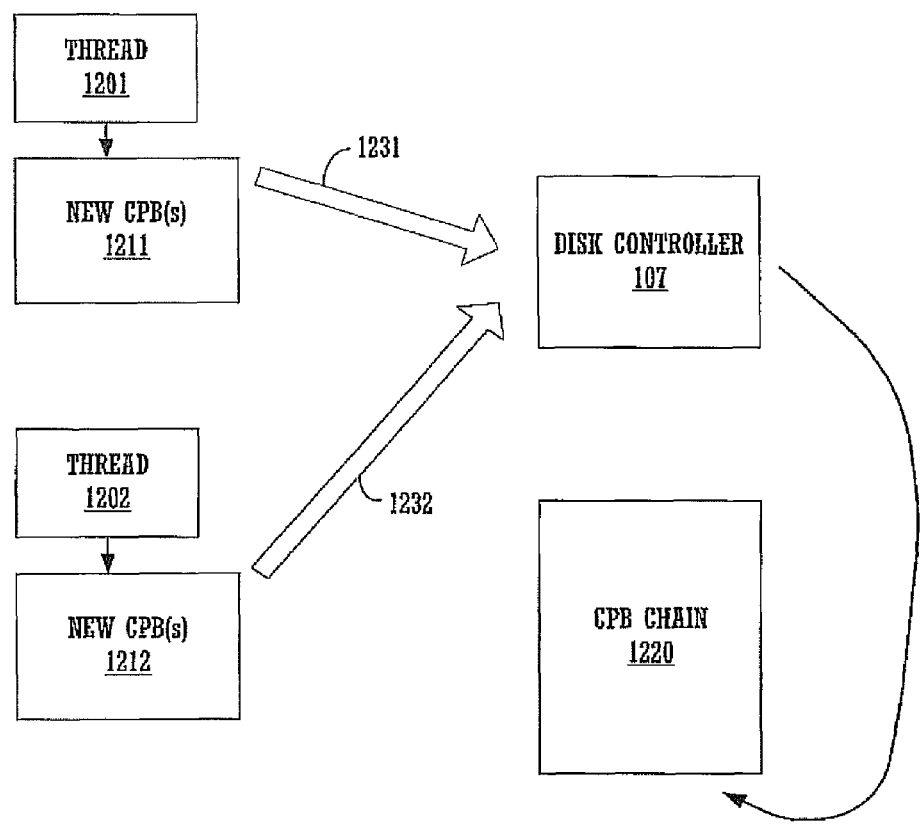
FIG. 12 shows a diagram depicting the operation of the disk controller with first and second threads in accordance with one embodiment of the present invention.

Dynamic Disk I/O Command Chain Apending Embodiments:

A command chain apending method as implemented by a disk controller architecture accordance with embodiments of the present invention is now described. FIG. 12 shows a diagram depicting the operation of the disk controller 107 with first and second threads 1201-1202 (e.g., executing on the CPU 101) in accordance with one embodiment of the present invention.

The disk controller 107 embodiment functions by implementing a method for dynamically appending disk I/O command chains of a computer system. As known by those skilled in the art, multiple disk I/O commands can be lined up (e.g., queued) by the disk controller by arranging the commands within a chain data structure. This is shown in FIG. 12 as the CPB chain 1220. The CPB chain 1220 generally comprises a chain of CPBs (command parameter blocks) that contain command sets that describe the disk transaction commands to be executed by the disk I/O engine (e.g., within the disk controller 107). The CPBs of the CPB chain 1220 are linked through a system of pointers, with each CPB have a pointer to the next CPB in the chain.

In the present embodiment, the threads 1201-1202 are able to add the new CPBs 1211-1212 to the existing CPB chain 1220 by accessing the disk controller 107. The threads 1201-1202 are typically software threads from a disk driver executing on the processor 101. Generally, the threads 1201-1202 are invoked by applications as the applications request some form of disk I/O (e.g., read data from the disk drive 106, write data to the disk drive 106, etc.). As shown in FIG. 12, the threads create new CPBs 1211-1212 that describe the requested disk I/O commands.

In the present embodiment, the threads 1201-1202 add to the existing CPB chain 1220 by accessing the disk controller 107, as shown by the arrows 1231-1232. The disk controller 107 then appends the CPB chain 1220 with the new CPBs 1211-1212. Thus, in the present embodiment, the disk controller 107 is responsible for arranging the pointers of the new CPBs 1211-1212 with respect to the CPB chain 1220. Threads executing on the processor 101 of the computer system do not directly access the CPB chain 1220. Thus, the entire prior art system (e.g., of the ADMA specification) of memory locks and the like to protect the coherency of the pointers of the CPB chain 1220 can be eliminated. In the present embodiment, responsibility for maintaining pointer coherency lies with the disk controller 107. For example, even though the threads 1201-1202 may try to add their CPBs 1211-1212 contemporaneously, the disk controller 107 includes logic that ensures the CPB chain 1220 is not "broken" as the new CPBs are added.

Figure 13:
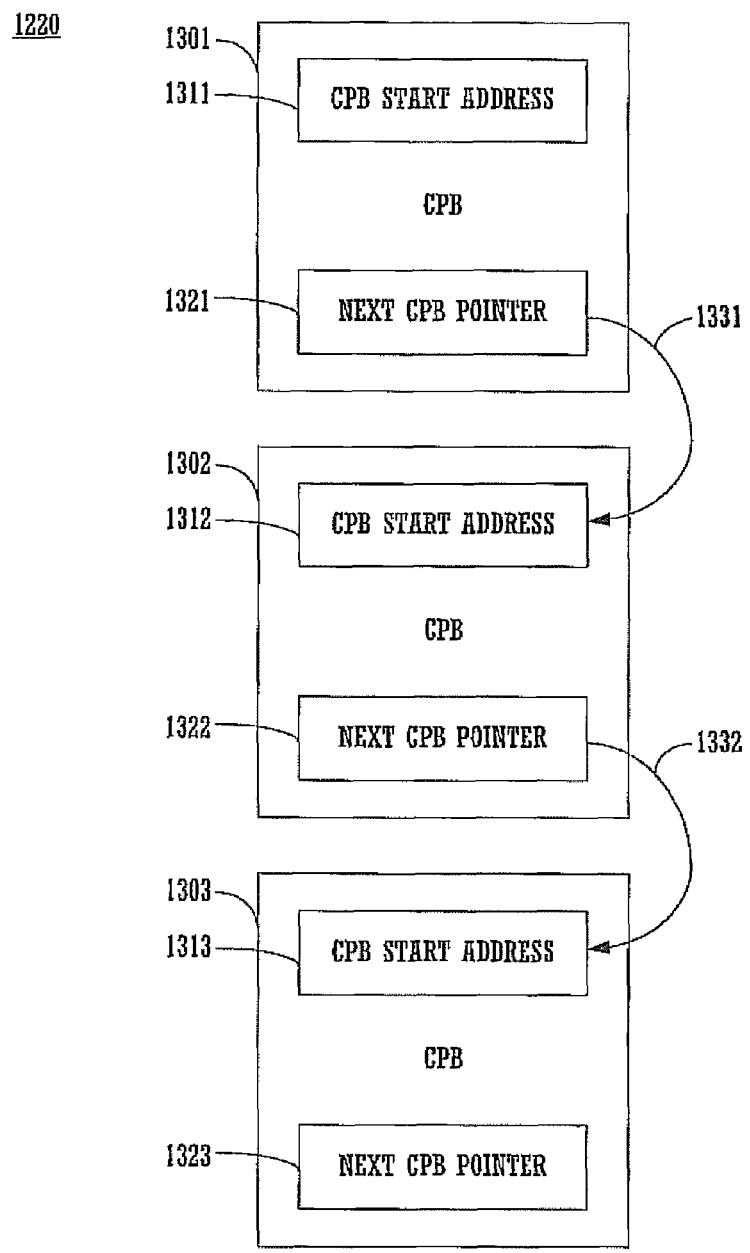
FIG. 13 shows a diagram depicting the CPB chain in accordance with one embodiment of the present invention.

FIG. 13 shows a diagram depicting the CPB chain 1220 in accordance with one embodiment of the present invention. Three CPBs 1301-1303 of the CPB chain 1220 are shown.

As described above, the CPBs of a CPB chain are linked through respective CPB pointers from one CPB to the next CPB in the chain. This is shown in FIG. 13 as the CPBs 1301-1303 each having respective CPB start addresses 1311-1313 and respective next CPB pointers 1321-1323. For example, as shown by the arrows 1331-1332, in the CPB 1301, the next CPB pointer 1321 points to the CPB start address 1312 of the CPB 1302, and the next CPB pointer 1322 points to the CPB start address 1313 of the CPB 1303. Thus, the CPB chain 1220 is appended by altering the next CPB pointer 1323 in the last CPB of the chain (e.g. CPB 1303) to include the new CPBs (e.g., CPBs 1211-1212).

In one embodiment, the threads 1201-1202 add their respective new CPBs by sending the start address of their respective CPB (e.g., the start address of the new CPB 1211 and the start address of the new CPB 1212). The actual CPB data structures themselves remain within system memory 103. The disk controller 107 uses the start addresses of the new CPBs 1211-1212 to retrieve them from the system memory 103 and append them to the CPB chain 1220.

Figure 14:
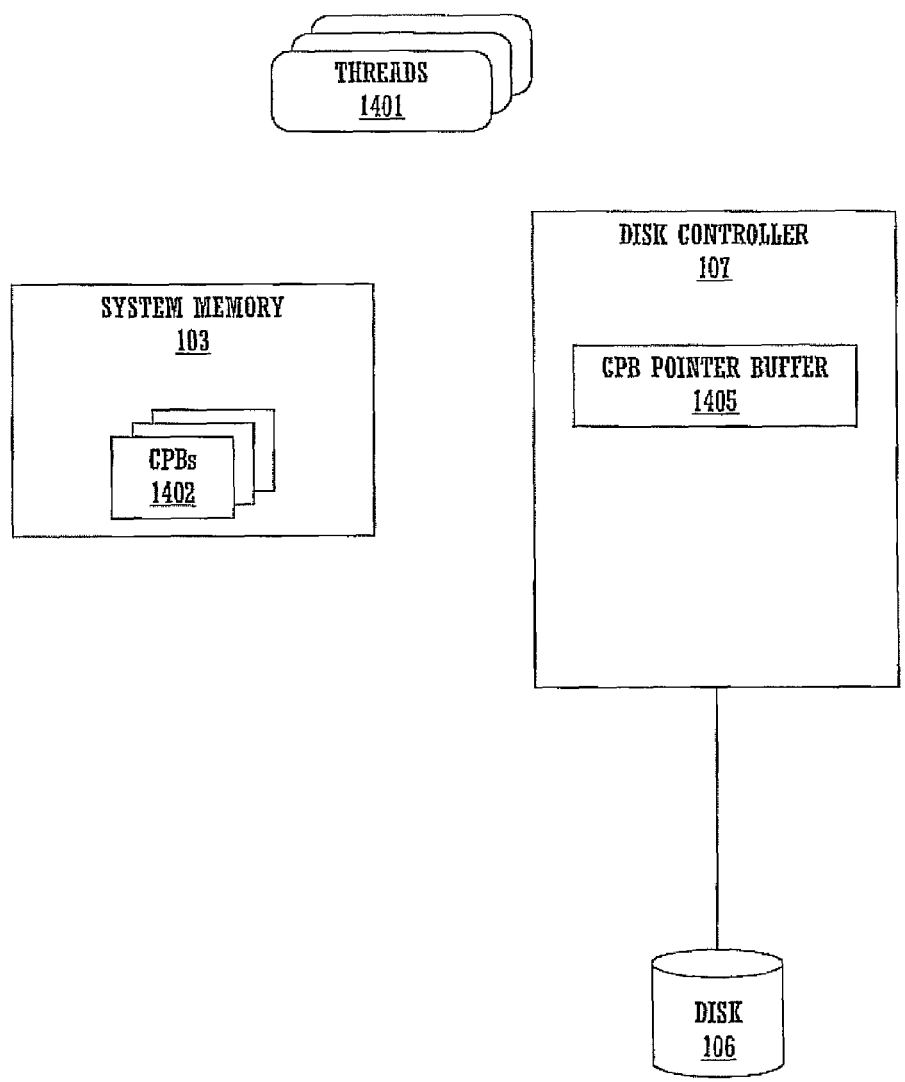
FIG. 14 shows a diagram of the disk controller having a CPB pointer buffer in accordance with one embodiment of the present invention.

FIG. 14 shows a diagram of the disk controller 107 having a CPB pointer buffer 1405 in accordance with one embodiment of the present invention. The CPB pointer buffer 1405 functions by storing the CPB start addresses (e.g., pointers) received from the threads 1401. In the present embodiment, the buffer 1405 stores the pointers on a FIFO (first-in first-out) basis. For example, the order in which the pointers are stored in the buffer 1405 determines the order in which the CPBs 1402 will be retrieved from the system memory 103 and appended to the CPB chain (e.g., CPB chain 1220 of FIG. 12). Thus, even though the multiple threads 1401 may contemporaneously add respective CPBs 1402 for execution by the disk controller 107, the disk controller 107 will use the pointers in the buffer 1405 to serially append the respective CPBs 1402 to the CPB chain while ensuring pointer coherency.

Figure 15:
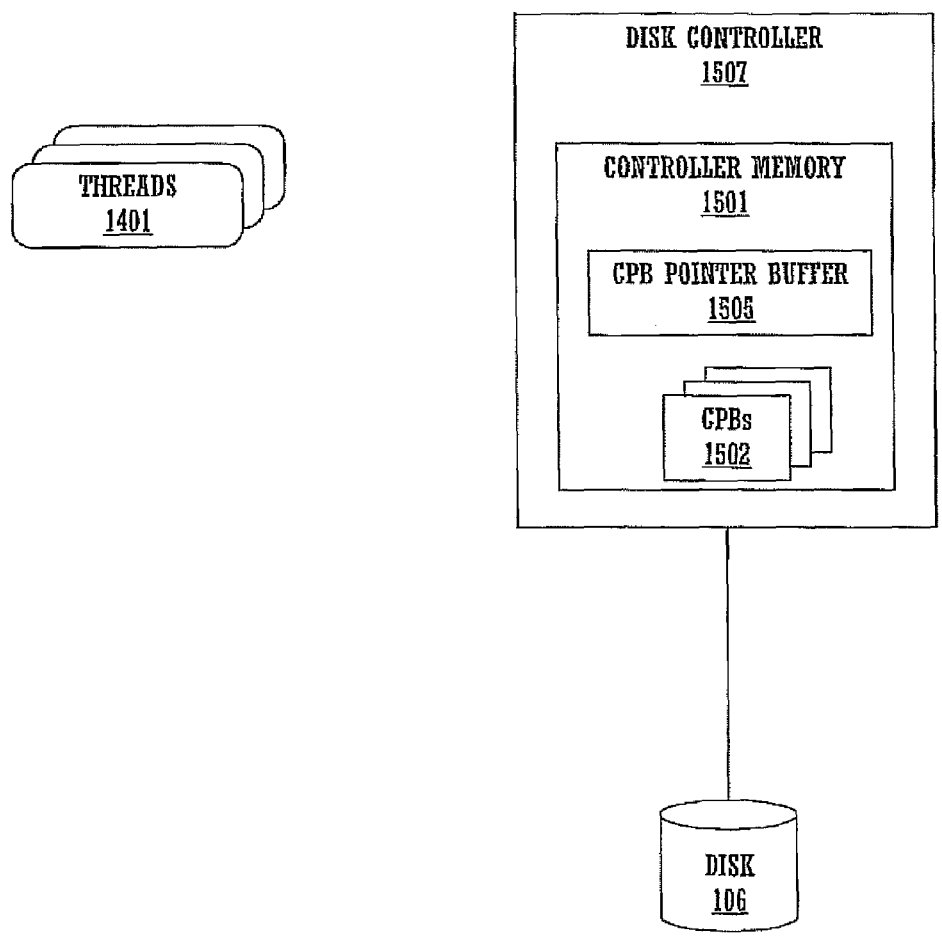
FIG. 15 shows a diagram a disk controller in accordance with an alternative embodiment of the present invention.

FIG. 15 shows a diagram a disk controller 1507 in accordance with an alternative embodiment of the present invention. In the disk controller 1507 embodiment, the pointer buffer 1505 is implemented as a data structure within an internal controller memory 1501 (e.g., and on-chip RAM). Similarly, the CPBs 1502 are stored within the controller memory 1501. The controller 1507 embodiment provides the advantage of reducing DMA transfers between system memory and the disk controller. Instead of pulling the CPBs from system memory, the disk controller 1507 maintains the CPBs directly within its memory 1501. For example, the threads 1401 push both the CPB pointers and the CPB data structures themselves to the disk controller 1507. As with the disk controller 107 embodiment of FIG. 14, the CPB pointer buffer stores pointers to the CPBs created by the threads 1401. However, as opposed to being a discrete buffer (e.g., the CPB pointer buffer 1405 of FIG. 14), the buffer 1505 is implemented as a data structure within the memory 1501.

Figure 16:
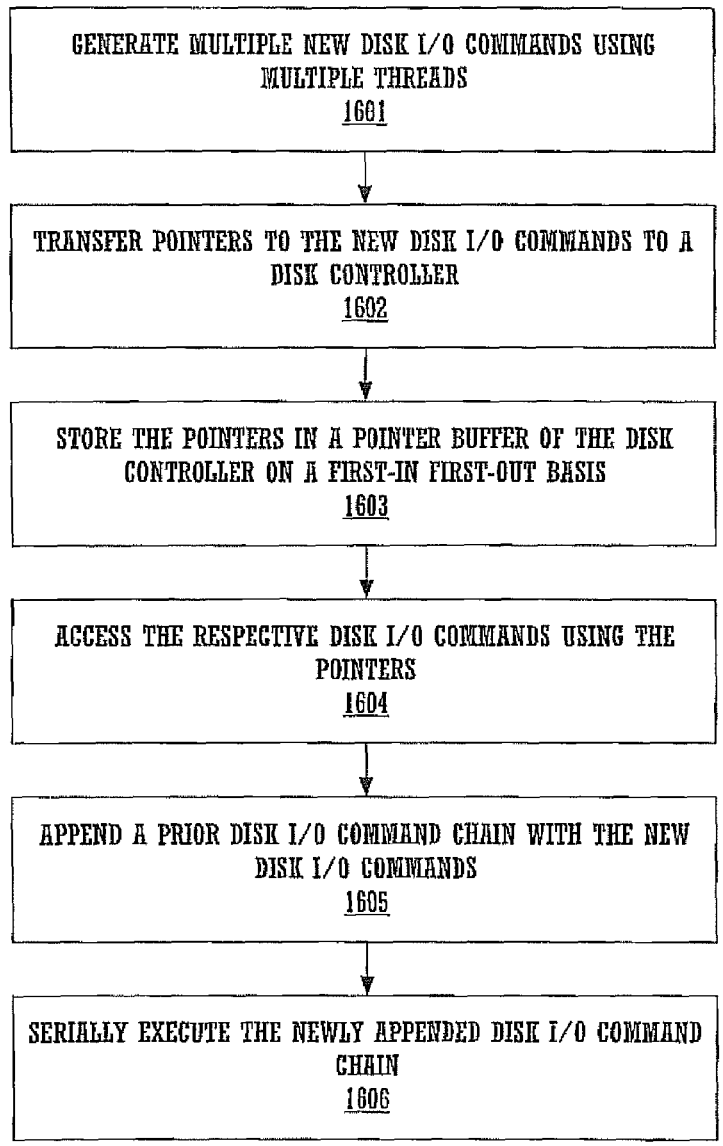
FIG. 16 shows a flowchart of the steps of a process in accordance with one embodiment of the present invention.

FIG. 16 shows a flowchart of the steps of a process 1600 in accordance with one embodiment of the present invention. As depicted in FIG. 16, process 1600 shows the general steps involved in a dynamic disk I/O command chain appending process as implemented by a computer system in accordance with one embodiment of the present invention (e.g., system 100 of FIG. 1).

Process 1600 begins in step 1601, where multiple threads executing on the computer system generate multiple new disk I/O commands. As described above, the multiple threads can result from different applications requesting disk I/O. For example, as each application requests a disk I/O, re-entrant disk I/O driver software can spawn multiple threads to implement the I/O commands. In step 1602, the threads transfer pointers to the new disk I/O commands to a disk controller coupled to the computer system. As described above, the pointers can be start addresses for new CPBs. The CPBs are created in system memory by the threads. The threads push the pointers to the disk controller.

In step 1603, the pointers are stored in a pointer buffer (e.g., CPB pointer buffer 405 of FIG. 4) of the disk controller on a FIFO basis. In step 1604, the disk controller then accesses the respective disk I/O commands by using the pointers. In one embodiment, the disk controller performs a DMA access to system memory, for example, using the pointers to find the respective CPBs. In another embodiment, the respective CPBs are stored within an on-chip RAM (e.g., controller memory 501 of FIG. 5) of the disk controller and are directly accessed therefrom. In step 1605, the prior disk I/O command chain is appended with the new disk I/O commands. The disk controller is responsible for ensuring the coherency of the pointers of the disk I/O command chain. Subsequently, in step 1606, the newly appended disk I/O command chain is serially executed by the disk controller and the coupled disk drive (e.g., disk drive 106).

In this manner, embodiments of the present invention allow multiple threads of a modern multithreaded, multitasking computer system to dynamically append disk I/O chains without imposing a cumbersome, CPU intensive, command chain locking scheme, as required by the prior art. Disk I/O command chain coherency is ensured by vesting chain concatenation responsibility in the disk controller (e.g., the disk controller hardware logic), as opposed to the multiple threads.

Figure 17:
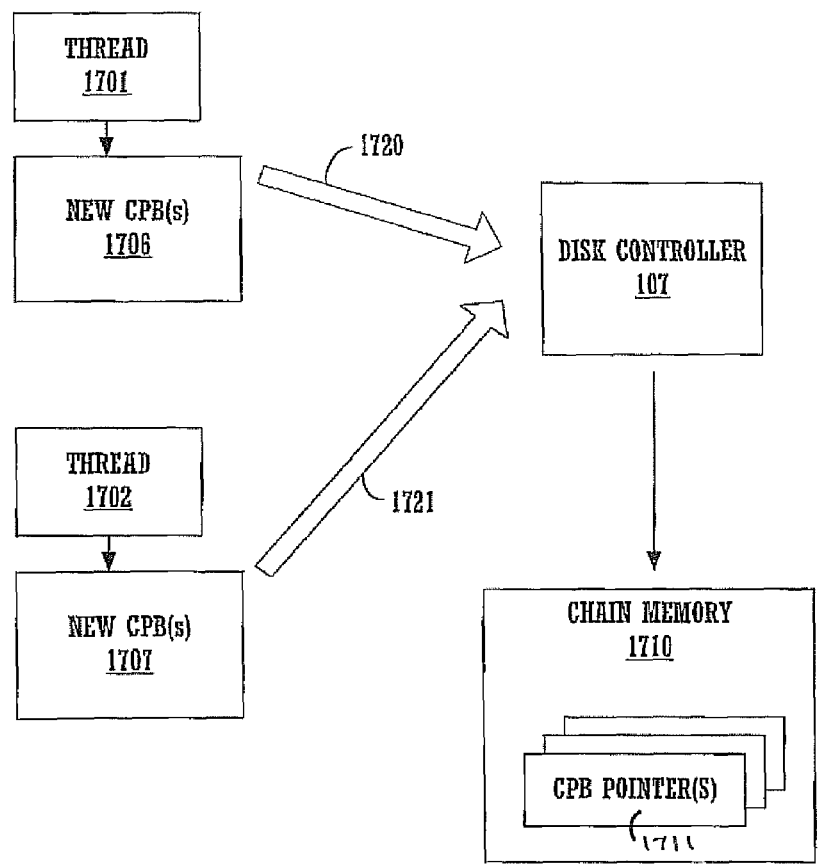
FIG. 17 shows a diagram depicting the operation of the disk controller with first and second threads in accordance with one embodiment of the present invention.

Dynamic Chain Buffering Embodiments:

A command chain buffering method as implemented by a disk controller architecture accordance with embodiments of the present invention is now described. FIG. 17 shows a diagram depicting the operation of the disk controller 107 with first and second threads 1701-1702 (e.g., executing on the CPU 101) in accordance with one embodiment of the present invention. The disk controller 107 embodiment functions by implementing a method for dynamically buffering disk I/O command chains of a computer system.

The threads 1701-1702 each generate a disk I/O command chain, illustrated as the new CPBs 1706 and 1707. As known by those skilled in the art, a thread can specify multiple disk I/O commands by arranging the commands within a chain data structure. When a thread wants to execute new disk I/O commands, it generates new disk I/O command chains. These chains comprise at least one CPB, and are typically two or more CPBs. This is shown in FIG. 17 as the new CPB(s) 1706 and 1707. The CPB(s) 1706-1707 each generally comprise a chain of CPBs (command parameter blocks) that contain command sets that describe the disk transaction commands to be executed by the disk I/O engine (e.g., within the disk controller 107). The CPBs of the CPB chains 1706-1707 are respectively linked through a system of pointers, with each CPB having a pointer to the next CPB in the chain.

In the present embodiment, the threads 1701-1702 are able to generate and specify their respective new CPB chains 1706-1707 for execution by the disk controller 107 without invoking any append commands, implementing any append operations, or the like. In the present embodiment, the disk controller 107 implements this functionality by dynamically buffering disk I/O command chains 1706-1707.

Referring still to FIG. 17, the threads 1701-1702 are typically software threads from a disk driver executing on the processor 101. Generally, the threads 1701-1702 are invoked by applications as the applications request some form of disk I/O (e.g., read data from the disk drive 106, write data to the disk drive 106, etc.). As shown in FIG. 17, the threads create new CPBs 1706-1707 that describe the requested disk I/O commands.

The threads 1701-1702 pass their new CPB chains 1706-1707 to the disk controller 107 by passing respective pointers to the respective first CPB of the CPB chains 1706-1707. This is depicted by the arrows 1720-1721. For example, thread 1701 transfers a pointer to the first CPB of the new CPB chain 1706 to the disk controller 107. Similarly, thread 1702 transfers a pointer to the first CPB of the new CPB chain 1707.

The disk controller 107 receives the pointers and stores the pointers for the disk I/O command chains in a controller memory 1710. In one embodiment, the controller memory 1710 implements a buffer for storing (e.g., in a FIFO) the CPB pointers (e.g., CPB pointers 1711). The disk I/O command chains (CPB chains 1706-1707) are accessed for execution by the disk controller 107 by serially accessing the pointers in the controller memory.

For example, the pointers for the disk I/O command chains can be stored in a buffer data structure of the controller memory 1710 on FIFO (first in first-out) basis. The disk controller 107 accesses one pointer, retrieves the corresponding CPB chain from system memory (e.g., system memory 103), executes the specified disk I/O commands, accesses the next pointer, retrieves the next pointer's corresponding CPB chain, executes the specified disk I/O commands, and so on. Thus, the CPB pointers 1711 enable the disk controller 107 to dynamically access the first disk I/O command of each of the disk I/O command chains and execute the chains in accordance with the order of the pointers in the buffer data structure.

In this manner, embodiments of the present invention allow multiple threads (e.g., threads 1701-1702) of a modern multithreaded, multitasking computer system to dynamically generate disk I/O command chains for execution by the disk controller (e.g., disk controller 107). Embodiments of the present invention dynamically access the disk I/O command chains by using queued pointers from controller memory (e.g., controller memory 1710). This attribute eliminates the appending of disk I/O chains, thereby eliminating the cumbersome, CPU intensive, command chain locking scheme, as required by the prior art. There are no disk I/O command chain coherency problems since chain concatenation is not required.

The new CPB chains 1706-1707 can be issued contemporaneously by their respective threads 1701-1702. In other words, multiple disk I/O command chains (e.g., multiple CPB chains) can be outstanding at a given time. The multiple outstanding disk I/O command chains are executed asynchronously by the disk controller 107 with respect to the threads executing on the processor 101. No appending of any CPB pointers is required.

Thus, the entire prior art scheme (e.g., of the ADMA specification) of memory locks and the like for protecting the coherency of the pointers of the CPB chain 1706 or the CPB chain 1707 can be eliminated. For example, in the present embodiment, the entire prior art burden for maintaining pointer coherency during an append operation is eliminated. The threads 1701-1702 add their CPBs 1706-1707 by transferring the pointers to their respective chains to the disk controller 107. There is no requirement to avoid breaking any existing, or prior, CPB chain as the new CPB chains are added.

Figure 18:
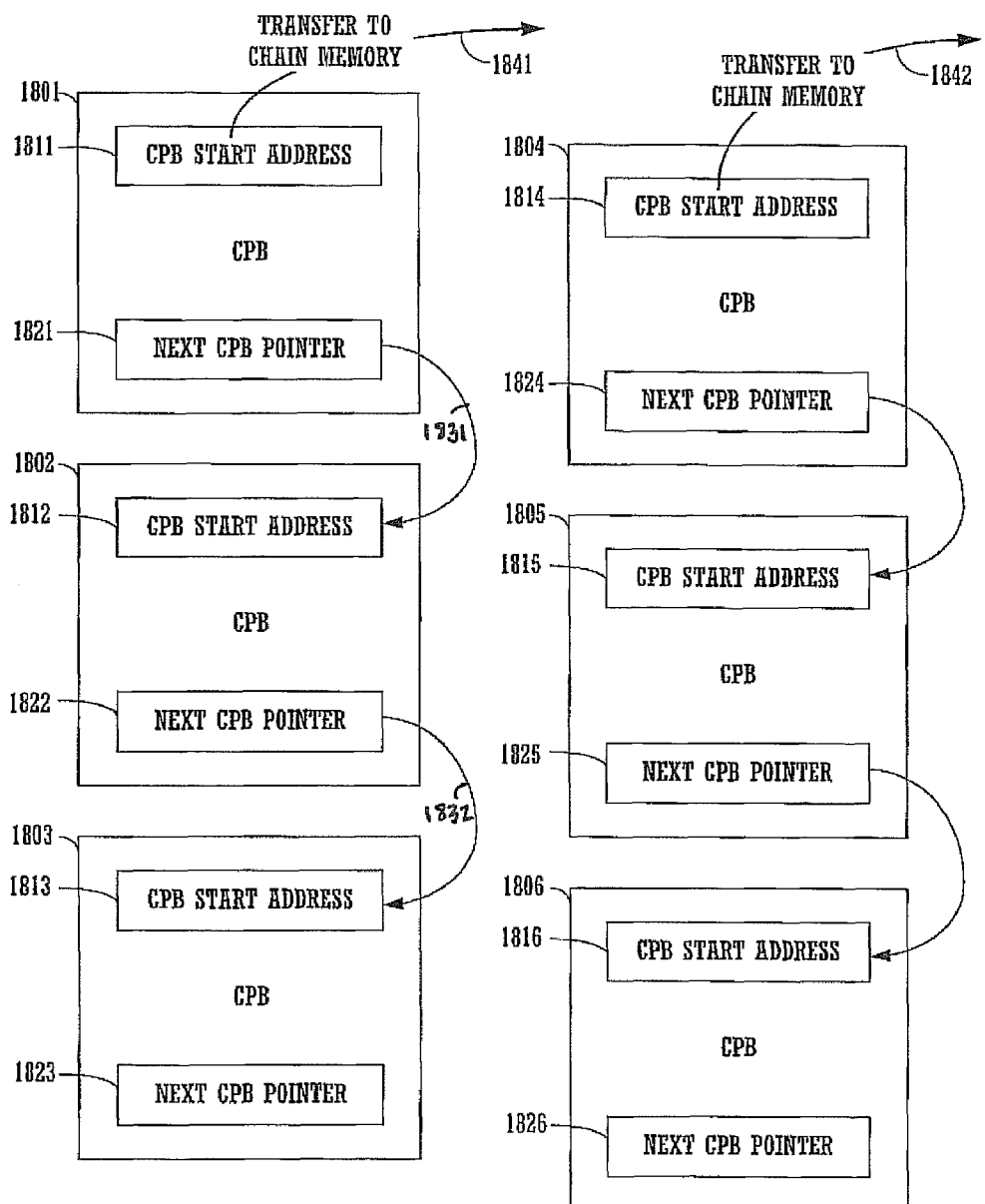
FIG. 18 shows a diagram depicting three CPBs of a first CPB chain and three CPBs of a second CPB chain in accordance with one embodiment of the present invention.

FIG. 18 shows a diagram depicting three CPBs 1801-1803 of a first CPB chain (e.g., CPB chain 1706) and three CPBs 1804-1806 of a second CPB chain (e.g., CPB chain 1707) in accordance with one embodiment of the present invention.

As described above, the CPBs of a CPB chain are linked through respective CPB pointers from one CPB to the next CPB in the chain. This is shown in FIG. 18 as the CPBs 1801-1803 each having respective CPB start addresses 1811-1813 and respective next CPB pointers 1821-1823. Similarly, the CPBs 1804-1806 each have respective CPB start addresses 1814-1816 and respective next CPB pointers 1824-1826. For example, as shown by the arrows 1831-1832, in the CPB 1801, the next CPB pointer 1821 points to the CPB start address 1812 of the CPB 1802, and the next CPB pointer 1822 points to the CPB start address 1813 of the CPB 1803.

In the present embodiment, the first chain (e.g., CPBs 1801-1803) and the second chain (e.g., CPBs 1804-1806) are prepared for execution by transferring their respective CPB start addresses 1811 and 1814 to chain memory, for example, the controller memory 1710 of the disk controller 107, for execution by the disk controller 107 in the manner described above. This is shown in FIG. 18 by the arrows 1841 and 1842.

Figure 19:
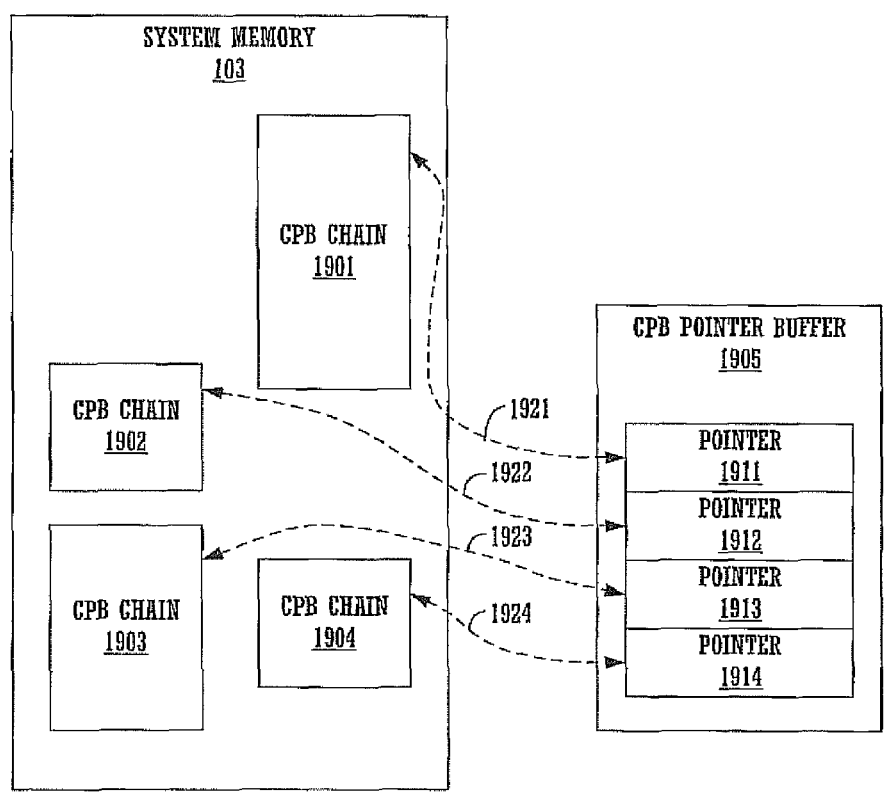
FIG. 19 shows a diagram depicting the system memory having a plurality of CPB chains and their respective pointers within a CPB pointer buffer in accordance with one embodiment of the present invention.

FIG. 19 shows a diagram depicting the system memory 103 having a plurality of CPB chains 1901-1904 and their respective pointers 1911-1914 within a CPB pointer buffer 1905 in accordance with one embodiment of the present invention.

In the FIG. 19 embodiment, the actual CPB data structures 1901-1904 remain within system memory 103. The disk controller 107 uses the pointers 1911-1914 (e.g., the start addresses) of the CPB chains 1901-1904 to retrieve them from the system memory 103 (e.g., via DMA transfer) and execute them. This is shown in FIG. 19 by the lines 1921-1924.

The CPB pointer buffer 1905 functions by storing the pointers 1911-1914 received from, for example, multiple disk I/O driver threads. In the present embodiment, the buffer 1905 stores the pointers on a FIFO (first-in first-out) basis. For example, the order in which the pointers are stored in the buffer 1905 determines the order in which the CPBs 1901-1904 will be retrieved from the system memory 103 and executed. Thus, even though the multiple threads may contemporaneously add respective pointers for execution by the disk controller, the disk controller will use the pointers 1911-1914 in the buffer 1905 to serially execute the respective CPBs 1901-1904. This execution occurs asynchronously with respect to the execution of the multiple threads.

Referring still to FIG. 19, in one embodiment, a CPU (central processor unit) lock function is used to load the buffer 1905 and an operating system lock function is used to handle the buffer 1905 after a buffer full condition occurs. As used herein, the term "CPU lock function" refers to the hardware support provided by a CPU when adding objects (e.g., pointers) to a FIFO. As known by those skilled in the art, the use of the CPU lock function allows the hardware functionality of the CPU (e.g., processor 101 of FIG. 1) to check for a FIFO buffer full condition prior to adding new objects (e.g., pointers) to the FIFO (e.g., to prevent buffer overflow).

The hardware functionality of the CPU lock function renders this method much faster than the corresponding operating system lock function. As used herein, the term "operating system lock function" refers to the software based support provided by an operating system when adding objects to a FIFO. As known by those skilled in the art, the use of the operating system lock function requires the invocation of at least one software routine and involves the execution of a hundred lines of software code, or more. Thus the operating system lock function is much slower. The software routine functions by checking for a FIFO buffer full condition prior to adding new objects to the FIFO.

The operating system lock function provides an advantage wherein, in case of a FIFO buffer full condition, the software code for handling the FIFO buffer full condition is able to run immediately. For example, in a case where the CPB pointer buffer 1905 is full, subsequent pointers can be stored in system memory 103 and added to the CPB pointer buffer 1905 at a later time (e.g., after one or more of the pointers stored in the pointer buffer 1905 have been processed and drained).

The use of the CPU lock function prior to a FIFO buffer full condition and the use of the operating system lock function after the occurrence of a FIFO buffer full condition enable embodiments of the present invention to efficiently support large numbers of outstanding disk I/O commands. For example, instead of the upper limit to the number of outstanding disk I/O commands being determined by the physical size of the CPB pointer buffer 1905, embodiments of the present invention are able to support an unbounded upper limit (e.g., after the buffer is full) by using the OS to queue outstanding disk I/O commands (e.g., in system memory 103) until space is available within the CPB pointer buffer 1905. This attribute is important since many applications (e.g., disk array subsystems, network-attached storage systems, and the like) can have a very large number of outstanding disk I/O commands.

Figure 20:
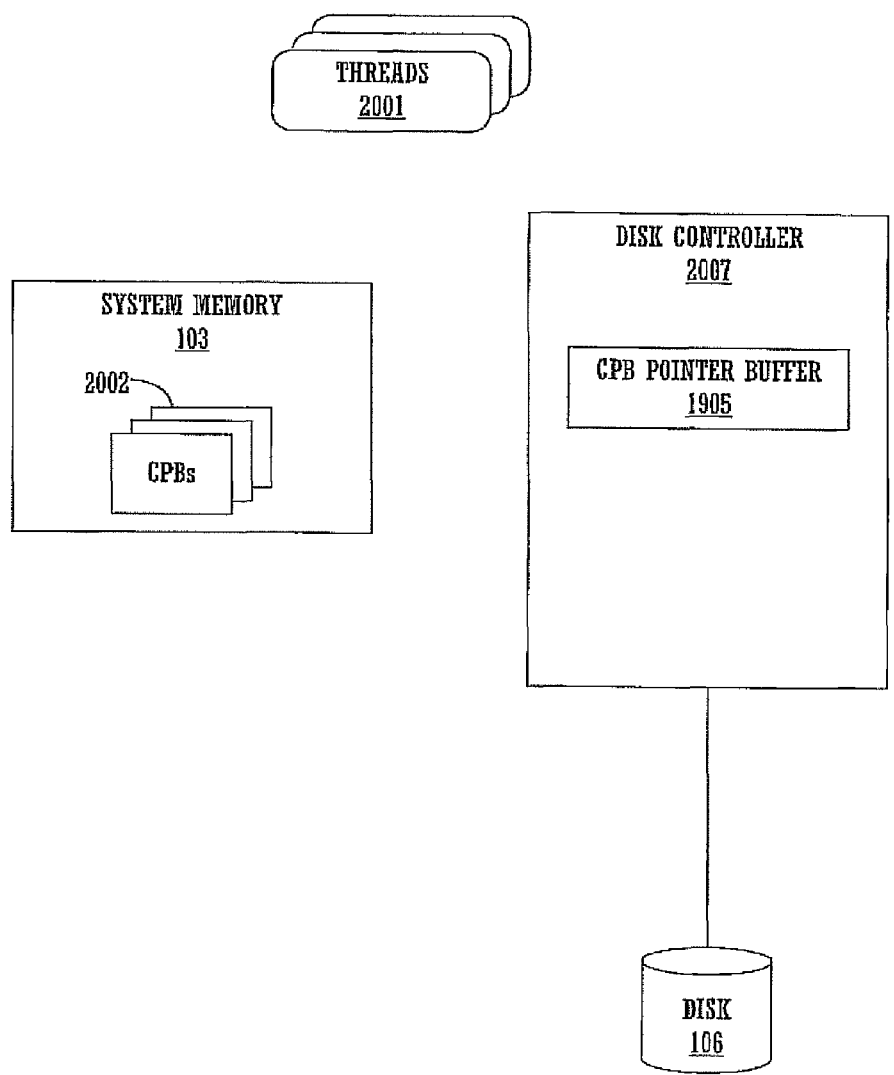
FIG. 20 shows a diagram of the disk controller in accordance with one embodiment of the present invention.

FIG. 20 shows a diagram of the disk controller 2007 in accordance with one embodiment of the present invention. In this embodiment, the CPB chains 2002 are stored within system memory 103 and their respective pointers are stored within the CPB pointer buffer 1905. FIG. 20 shows the multiple threads 2001 (e.g., executing on the processor 101) that generate the CPB chains 2002.

Figure 21:
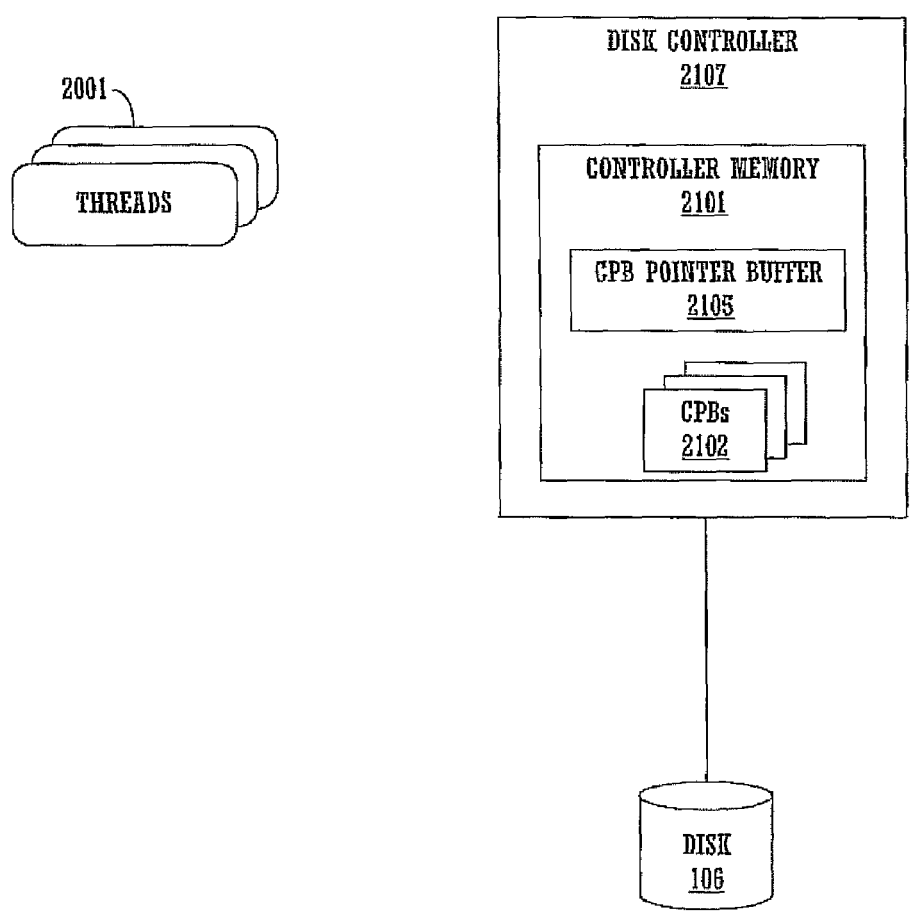
FIG. 21 shows a diagram a disk controller in accordance with an alternative embodiment of the present invention.

FIG. 21 shows a diagram a disk controller 2107 in accordance with an alternative embodiment of the present invention. In the disk controller 2107 embodiment, the pointer buffer 2105 is implemented as a data structure within an internal controller memory 2101 (e.g., and on-chip RAM). Similarly, in this embodiment, the CPBs 2102 are stored within the controller memory 2101. The controller 2107 embodiment provides the advantage of reducing DMA transfers between system memory and the disk controller. Instead of pulling the CPBs from system memory, the disk controller 2107 maintains the CPBs directly within its memory 2101. For example, the threads 2001 push both the CPB pointers and the CPB data structures themselves to the disk controller 2107. As with the disk controller 2007 embodiment of FIG. 20, the CPB pointer buffer 2105 stores pointers to the CPBs created by the threads 2001. However, as opposed to being a discrete buffer (e.g., the CPB pointer buffer 2005 of FIG. 20), the buffer 2105 is implemented as a data structure within the controller memory 2101.

Figure 22:
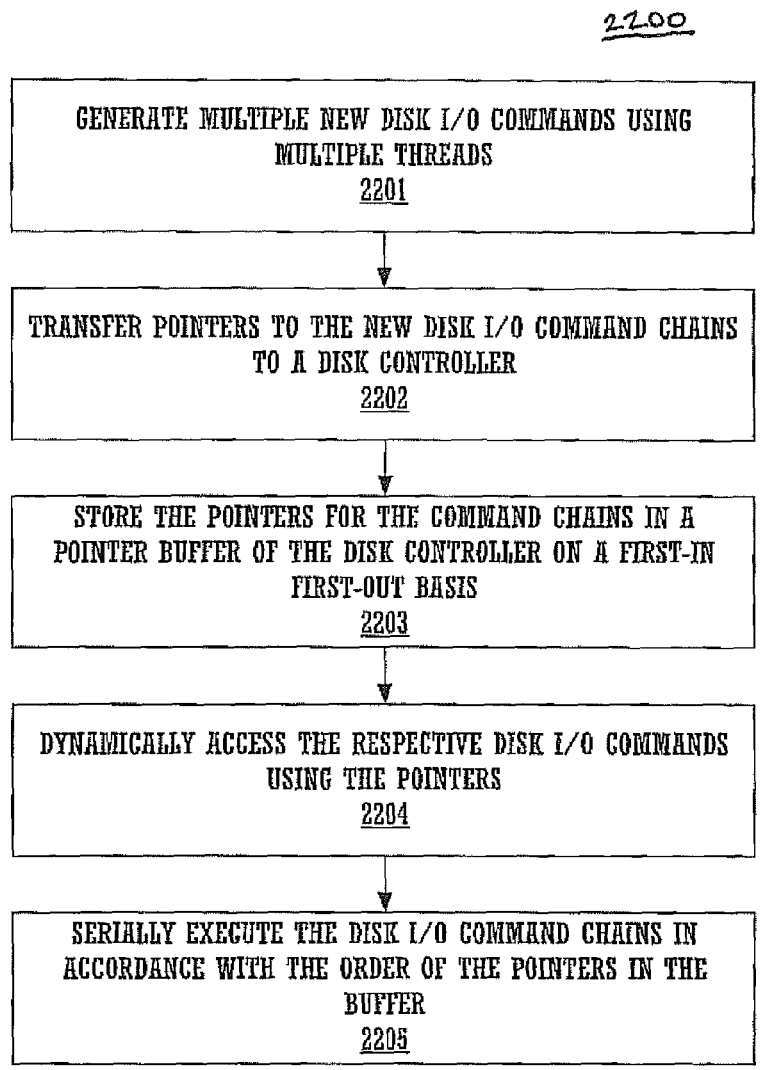
FIG. 22 shows a flowchart of the steps of a process in accordance with one embodiment of the present invention.

FIG. 22 shows a flowchart of the steps of a process 2200 in accordance with one embodiment of the present invention. As depicted in FIG. 22, process 2200 shows the general steps involved in a dynamic disk I/O command chain buffering process as implemented by a computer system in accordance with one embodiment of the present invention (e.g., system 100 of FIG. 1).

Process 2200 begins in step 2201, where multiple threads executing on the computer system generate multiple new disk I/O command chains. As described above, the multiple threads can result from different applications requesting disk I/O. For example, as each application requests a disk I/O, re-entrant disk I/O driver software can spawn multiple threads to implement the I/O commands. In step 2202, the threads transfer pointers to the new disk I/O commands to a disk controller coupled to the computer system. As described above, the pointers can be a start address for the first CPB of a chain of CPBs. The CPB chains are created in system memory by the threads. The threads push the pointers to the disk controller.

In step 2203, the pointers are stored in a pointer buffer (e.g., CPB pointer buffer 1905 of FIG. 20) of the disk controller on a FIFO basis. In step 2204, the disk controller then dynamically accesses the respective disk I/O command chains by using the pointers. In one embodiment, the disk controller performs a DMA access to system memory, for example, using the pointers to find the respective CPB chains. In another embodiment, the respective CPBs are stored within an on-chip RAM (e.g., controller memory 2101 of FIG. 21) of the disk controller and are directly accessed therefrom. In step 2205, the retrieved disk I/O command chains are serially executed by the disk controller in accordance with the order of the pointers in the buffer. As described above, the execution of the command chains occurs asynchronously with respect to the threads executing on the processor of the computer system.

In this manner, embodiments of the present invention allow multiple threads of a modern multithreaded, multitasking computer system to dynamically issue multiple disk I/O command chains while eliminating overhead associated with command chain appending mechanisms. Multiple disk I/O command chains can be issued and be outstanding without incurring any overhead from cumbersome, CPU intensive, command chain appending and command chain locking schemes, as required by the prior art.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A disk controller for implementing efficient disk I/O for a computer system, comprising:
  a bus interface for interfacing with a processor and a system memory of the computer system;
  a disk I/O engine coupled to the bus interface;
  a bus master controller coupled to the disk I/O engine;
  a plurality of bypass registers coupled to the bus master controller, wherein each bypass register of the plurality of bypass registers is memory mapped and aggregates disk transaction information therein through memory mapped data transfers from a host CPU;
  an arbiter couple to the bus master controller and the disk I/O engine, to coordinate data transfers within the disk controller;
  a chain memory coupled to the disk I/O engine for buffering a plurality of CPBs to extend a number of disk transactions scheduled for execution by the disk I/O engine; and
  a device interface coupled to the disk I/O engine for interfacing the disk I/O engine with a disk drive, wherein the disk I/O engine is configured to cause a start up of the disk drive upon receiving a disk start up command from the processor and before packaging of a disk transaction information associated with the start up, the start up command configured to hide a start latency of the disk drive, the disk I/O engine further configured to execute the disk transaction by processing the disk transaction information from the bypass register coupled to the disk I/O engine.

2. The disk controller of claim 1, further comprising:
  a CPB pointer buffer coupled to the disk I/O engine for dynamically appending a plurality of CPB pointers to extend to a number of disk transactions scheduled for execution by the disk I/O engine, the CPB pointer buffers directly connected to the disk I/O engine for control independent of the arbiter.

3. A bridge component for implementing efficient disk I/O for a computer system, comprising:
  a bus interface for interfacing with a processor and a system memory of the computer system;
  a disk controller for executing disk I/O transactions for the computer system, the disk controller further comprising:
  a disk I/O engine coupled to the bus interface;
  a bus master controller coupled to the disk I/O engine;
  a plurality of bypass registers coupled to the bus master controller, wherein each bypass register of the plurality of registers is memory mapped and aggregates disk transaction information therein through a host CPU by using a memory mapped data transfer;

an arbiter couple to the bus master controller and the disk I/O engine, to coordinate data transfers within the disk controller;

a chain memory coupled to the disk I/O engine for buffering a plurality of CPBs to extend a number of disk transactions scheduled for execution by the disk I/O engine; and a device interface coupled to the disk I/O engine for interfacing the disk I/O engine with a disk drive, wherein the disk I/O engine is configured to cause a start up of the disk drive upon receiving a disk start up command from the processor, before completion of said start up and before packaging of a disk transaction information associated with the start up, the disk start up command configured to hide a start latency of the disk drive, the disk I/O engine further configured to execute a disk transaction by processing the disk transaction information from the bypass register coupled to the disk I/O engine.

4. The disk controller of claim 3, further comprising:

a CPB pointer buffer coupled to the disk I/O engine for dynamically appending a plurality of CPB pointers to extend to a number of disk transactions scheduled for execution by the disk I/O engine, the CPB pointer buffers directly connected to the disk I/O engine for control independent of the arbiter.

5. A disk controller for implementing efficient disk I/O for a computer system, comprising:

a bus interface for interfacing with a processor and a system memory of the computer system;

a disk I/O engine coupled to the bus interface;

a bus master controller coupled to the disk I/O engine;

a plurality of bypass registers coupled to the bus master controller, wherein each bypass register of the plurality of bypass registers is memory mapped and aggregates disk transaction information therein from a host CPU through a memory mapped data transfer;

an arbiter couple to the bus master controller and the disk I/O engine, to coordinate data transfers within the disk controller;

a chain memory coupled to the disk I/O engine for buffering a plurality of CPBs to extend a number of disk transactions scheduled for execution by the disk I/O engine; and a device interface coupled to the disk I/O engine for interfacing the disk I/O engine with a disk drive, wherein the disk I/O engine is configured to cause a start up of the disk drive upon receiving a disk start up command from the processor, before completion of said start up and before packaging of a disk transaction information associated with the start up, the start up command configured to hide a start latency of the disk drive, the disk I/O engine further configured to execute a disk transaction by processing the disk transaction information from the bypass register coupled to the disk I/O engine.

\* \* \* \* \*